United States Patent
Khademhosseini et al.

(10) Patent No.: US 12,515,032 B2
(45) Date of Patent: Jan. 6, 2026

(54) GELATIN METHACRYLOYL-BASED MICRONEEDLE PATCHES FOR DELIVERY OF WATER-INSOLUBLE DRUGS

(71) Applicant: THE REGENTS OF THE UNIVERSITY OF CALIFORNIA, Oakland, CA (US)

(72) Inventors: Alireza Khademhosseini, Los Angeles, CA (US); Wujin Sun, Los Angeles, CA (US); Xingwu Zhou, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 786 days.

(21) Appl. No.: 17/911,132

(22) PCT Filed: Mar. 23, 2021

(86) PCT No.: PCT/US2021/023753
§ 371 (c)(1),
(2) Date: Sep. 13, 2022

(87) PCT Pub. No.: WO2021/195129
PCT Pub. Date: Sep. 30, 2021

(65) Prior Publication Data
US 2023/0145564 A1    May 11, 2023

Related U.S. Application Data
(60) Provisional application No. 62/994,740, filed on Mar. 25, 2020.

(51) Int. Cl.
*A61M 37/00*    (2006.01)
*A61K 9/00*    (2006.01)
(Continued)

(52) U.S. Cl.
CPC ....... *A61M 37/0015* (2013.01); *A61K 9/0021* (2013.01); *A61K 9/7084* (2013.01);
(Continued)

(58) Field of Classification Search
CPC ............. A61M 37/0015; A61K 9/0021; A61K 9/7084; A61K 31/12; A61K 47/40; A61K 47/42
(Continued)

(56) References Cited

U.S. PATENT DOCUMENTS
6,458,386 B1 * 10/2002 Schacht ................ A61L 15/225
424/443
2015/0274805 A1    10/2015 Annabi et al.
(Continued)

FOREIGN PATENT DOCUMENTS
WO    WO 2020/092229    5/2020
WO    WO 2020/146031    7/2020
(Continued)

OTHER PUBLICATIONS
PCT International Search Report for PCT/US2021/023753, Applicant: The Regents of the University of California, Form PCT/ISA/210 and 220, dated Jun. 3, 2021 (3 pages).
(Continued)

*Primary Examiner* — Phillip A Gray
(74) *Attorney, Agent, or Firm* — VISTA IP LAW GROUP LLP

(57) ABSTRACT

A patch incorporates biodegradable microneedles (MNs) that are fabricated from naturally derived polymer conjugates of gelatin methacryloyl and β-cyclodextrin (GelMA-β-CD). When curcumin, an unstable and water-insoluble anticancer therapeutic agent, is loaded as an example, its stability and solubility are improved due to the formation of inclusion complex. The polymer-drug complex GelMA-β-
(Continued)

CD/CUR can be formulated into MN arrays with sufficient mechanical strength for skin penetration and tunable drug release profile. Anticancer efficacy of released curcumin is observed in three-dimensional (3D) B16F10 melanoma models. The GelMA-β-CD/CUR MN exhibits relatively higher therapeutic efficacy through more localized and deeper penetrated manner compared with a control non-transdermal patch. In vivo studies verify biocompatibility and degradability of the GelMA-β-CD MN-based patch. Other water-insoluble therapeutic agents may be loaded into the patch.

20 Claims, 17 Drawing Sheets

(51) Int. Cl.
  *A61K 9/70* (2006.01)
  *A61K 31/12* (2006.01)
  *A61K 47/40* (2006.01)
  *A61K 47/42* (2017.01)

(52) U.S. Cl.
  CPC .............. *A61K 31/12* (2013.01); *A61K 47/40* (2013.01); *A61K 47/42* (2013.01); *A61M 2037/0023* (2013.01); *A61M 2037/0046* (2013.01)

(58) Field of Classification Search
  USPC .......................................................... 604/22
  See application file for complete search history.

(56) References Cited

U.S. PATENT DOCUMENTS

| | | |
|---|---|---|
| 2016/0144068 A1 | 5/2016 | Gaharwar et al. |
| 2017/0232138 A1 | 8/2017 | Khademhosseini et al. |
| 2019/0022280 A1 | 1/2019 | Khademhosseini et al. |
| 2019/0184147 A1* | 6/2019 | Singh .................. A61K 9/0021 |
| 2021/0386985 A1 | 12/2021 | Khademhosseini et al. |
| 2022/0218867 A1 | 7/2022 | Sheikhi et al. |

FOREIGN PATENT DOCUMENTS

| | | |
|---|---|---|
| WO | WO 2020/168338 | 8/2020 |
| WO | WO 2021/119332 | 6/2021 |
| WO | WO 2021/142160 | 7/2021 |

OTHER PUBLICATIONS

PCT Written Opinion of the International Search Authority for PCT/US2021/023753, Applicant: The Regents of the University of California, Form PCT/ISA/237, dated Jun. 3, 2021 (6 pages).

Chemotherapy, Wikipedia, Jan. 29, 2020, retrieved from https://en.wikipedia.org/w/index.php?title=Chemotherapy&oldid=938083668>entirety of document especially, p. 17, para 4.

Farris, Skin Anatomy and Physiology, Jun. 29, 2018, retrieved from http://web.archive.org/web/20180629211740/https://www.nuskin.com/en_ZA/corporate/company/science/skin_care_science/skin_anatomy_andphysiology.html>entirety of document especially, p. 2, para 4.

Haroun et al., Encapsulation of bovine serum albumin within beta-cyclodextrin/gelatin-based polymeric hydrogel for controlled protein drug release, IRBM, 31 (2010), 234-241.

Luiz E. Bertassonia et al., Direct-write Bioprinting of Cell-laden Methacrylated Gelatin Hydrogels, Biofabrication, Jun. 2014; 6(2): 024105. doi:10.1088/1758-5082/6/2/024105.

Mark E. Davis et al., Cyclodextrin-Based Pharmaceutics: Past, Present and Future, Article in Nature Reviews, Drug Discovery, vol. 3, Dec. 2004, 1023-1035.

Eneko Larrañeta et al., Hydrogels for Hydrophobic Drug Delivery, Classification, Synthesis and Applications, J. Funct. Biomater, 2018, 9, 13; doi: 10.3390/jfb9010013 (20 pages).

Zhimin Luo et al., Biodegradable Gelatin Methacryloyl Microneedles for Transdermal Drug Delivery, Adv Healthc Mater, Feb. 2019, 8(3): e1801054. doi:10.1002/adhm.201801054 (17 pages).

Maricica Munteanu et al., Cyclodextrin Methacrylate via Microwave-Assisted Click Reaction, Macromolecules 2008, 41, 9619-9623.

Jason W. Nichol et al., Cell-laden microengineered gelatin methacrylate hydrogels, Biomaterials, Jul. 2010, 31(21): 5536-5544.

Iman Noshadia et al., In Vitro and In Vivo Analysis of Visible Light Crosslinkable Gelatin Methacryloyl (GelMA) Hydrogels, Biomater Sci., Sep. 2, 20176; 5(10): 2093-2105. doi:10.1039/c7bm00110j.

Wujin Sun et al., Engineering Precision Medicine, Adv. Sci. 2018, 1801039, (19 pages).

Vivek R. Yadav et al., Effect of Cyclodextrin Complexation of Curcumin on its Solubility and Antiangiogenic and Anti-inflammatory Activity in Rat Colitis Model, AAPS PharmSciTech, vol. 10, No. 3, Sep. 2009, 752-762.

Kan Yue et al., Synthesis, properties, and biomedical applications of gelatin methacryloyl (GelMA) hydrogels, Biomaterials, 73, (2015), 254-271.

Kan Yue et al., Structural analysis of photocrosslinkable methacryloyl-modified protein derivatives, Biomaterials, 139, (2017), 163-171.

Jianxiang Zhang et al., Cyclodextrin-based supramolecular systems for drug delivery: Recent progress and future perspective, Adv Drug Deliv Rev., Aug. 2013; 65(9): doi:10.1016/j.addr.2013.05.001.

Jixiang Zhu et al., Gelatin methacryloyl microneedle patches for minimally-invasive extraction of skin interstitial fluid, Small, Apr. 2020, 16(16): e1905910, doi: 10.1002/smll.201905910.

Chengde Liu et al., Gelatin-based hydrogels with b-cyclodextrin as a dual functional component for enhanced drug loading and controlled release, RSC Adv., 2013, 3, 25041.

Naoki Nakajima et al., Mechanism of Amide Formation by Carbodiimide for Bioconjugation in Aqueous Media, Bioconjugate Chem. 1995, 6, 123-130.

PCT International Preliminary Report on Patentability (Chapter I of the Patent Cooperation Treaty) for PCT/US2021/023753, Applicant: The Regents of the University of California, Form PCT/IB/326 and 373, dated Oct. 6, 2022 (8 pages).

* cited by examiner

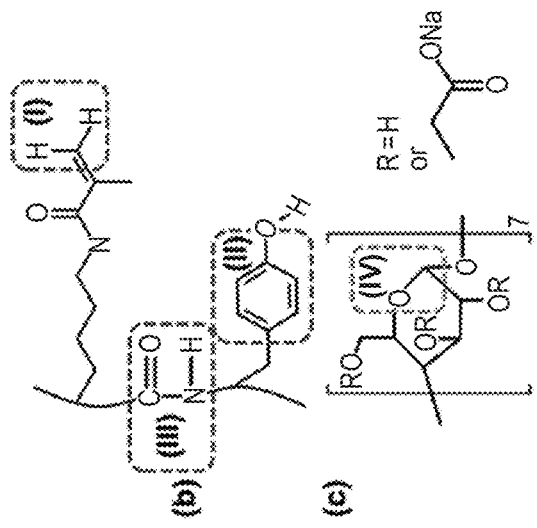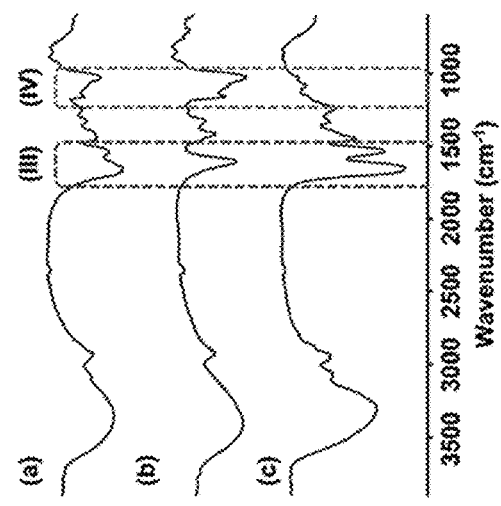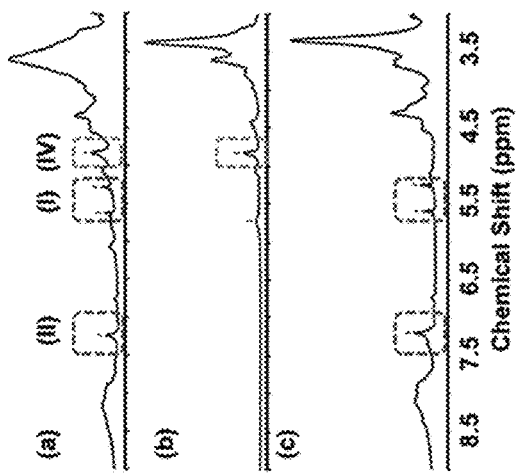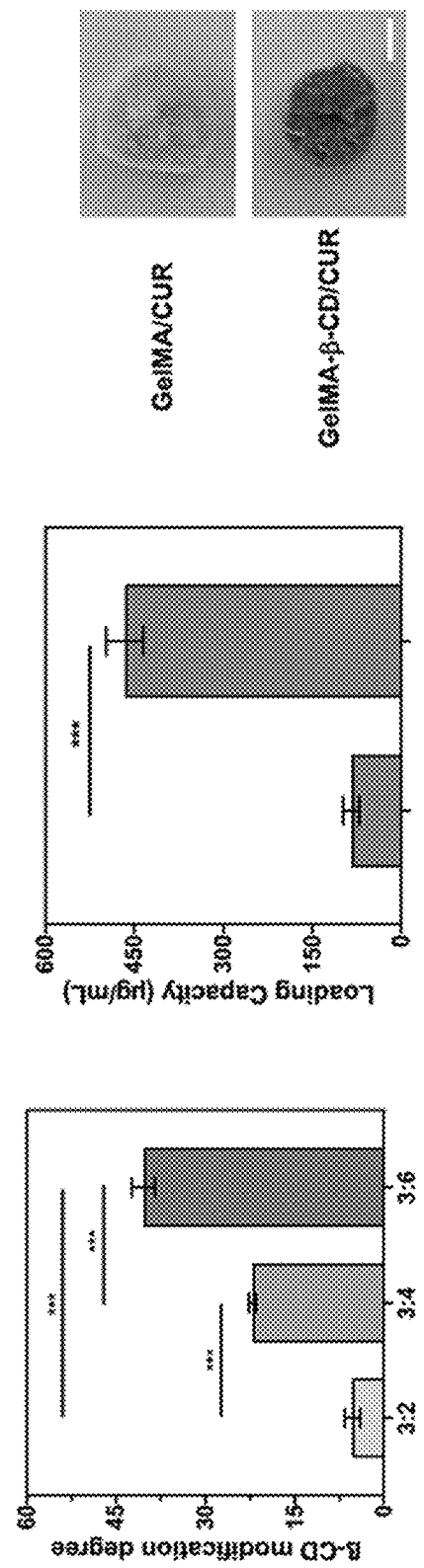
FIG. 3A FIG. 3B FIG. 3C FIG. 3D FIG. 3E FIG. 3F

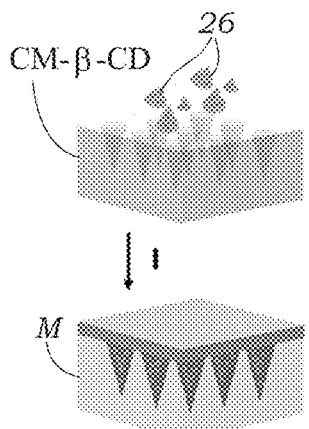
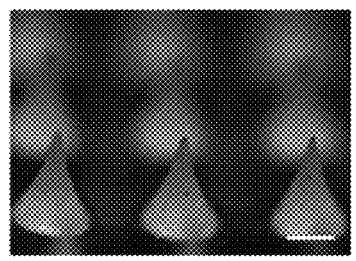
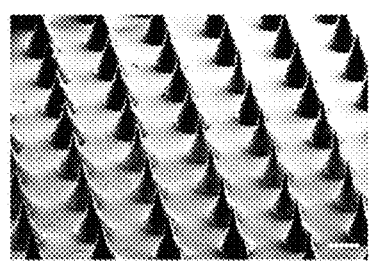
FIG. 5B    FIG. 5C
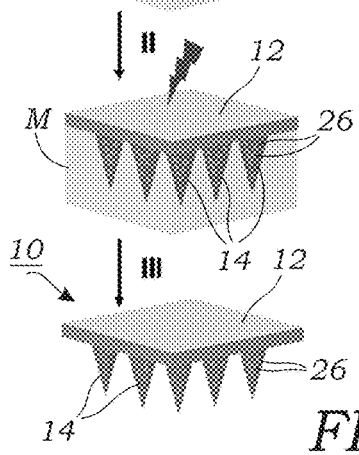
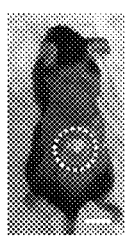
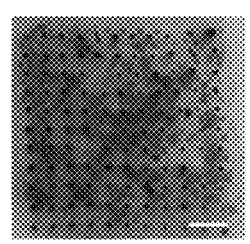
FIG. 5A    FIG. 5D    FIG. 5E    FIG. 5F
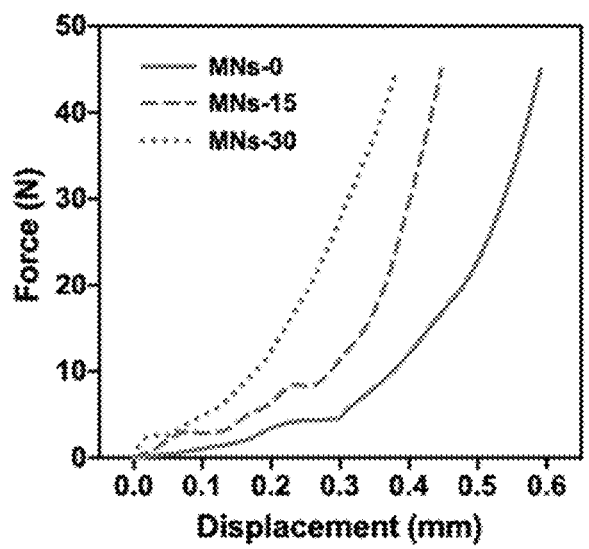
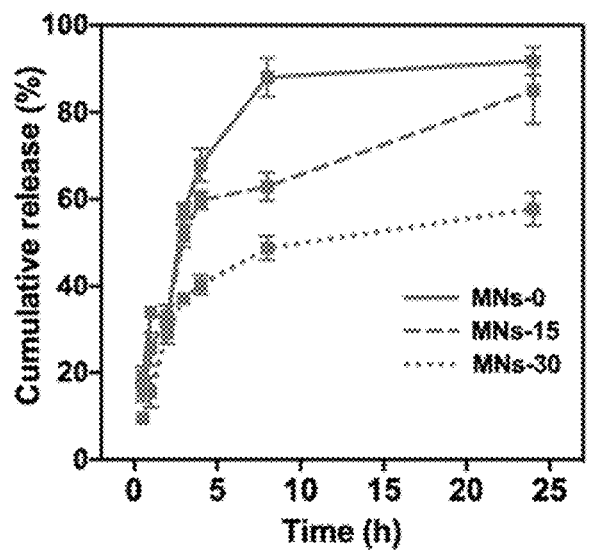
FIG. 5G    FIG. 5H

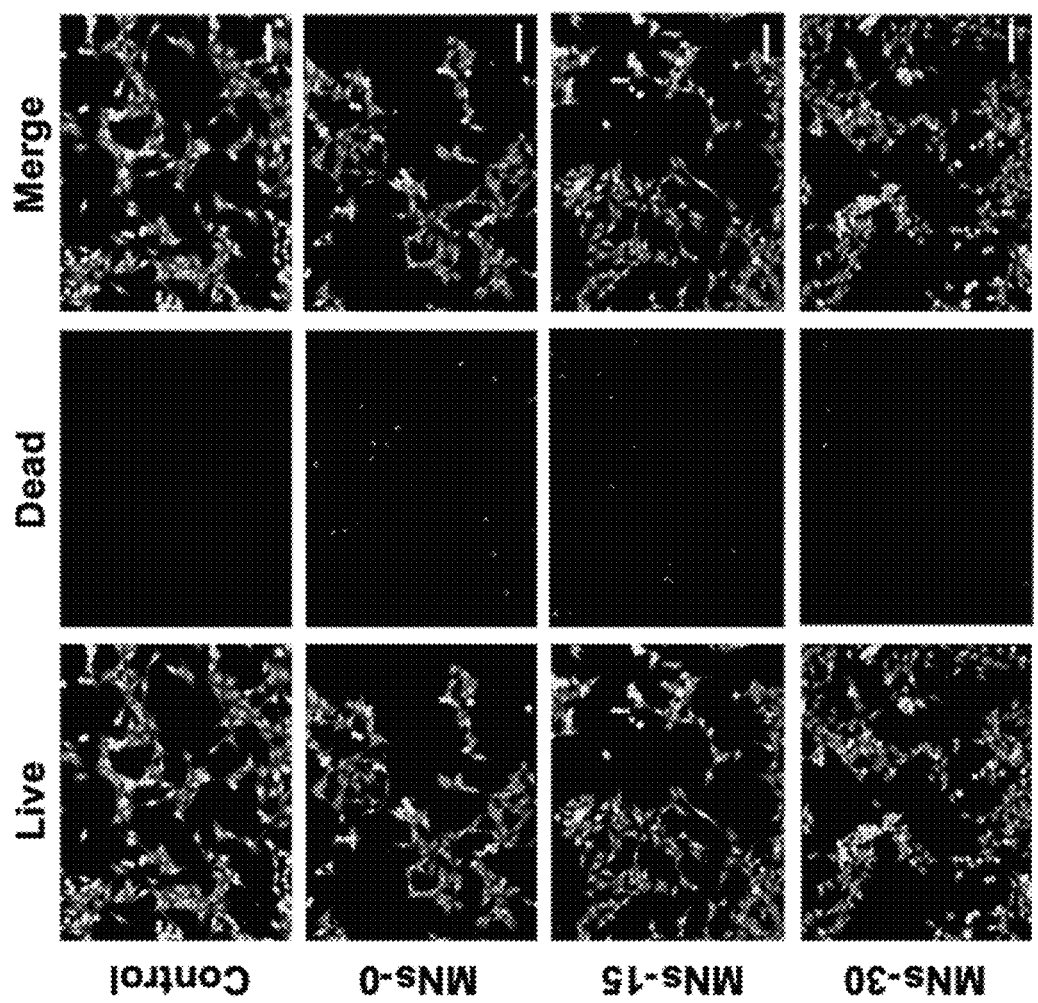
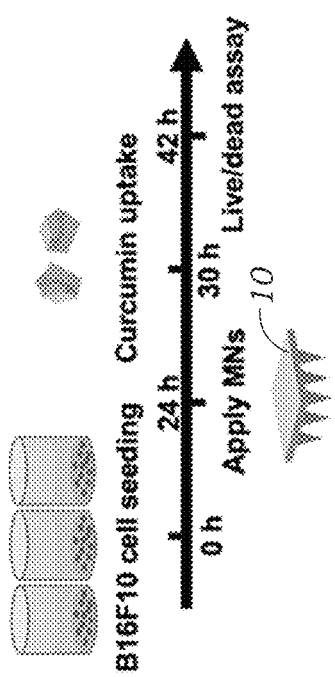
*FIG. 6A*
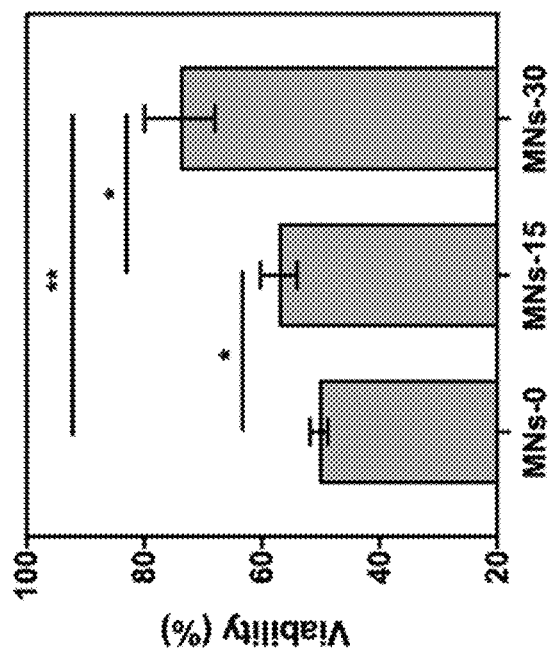
*FIG. 6B*
*FIG. 6C*

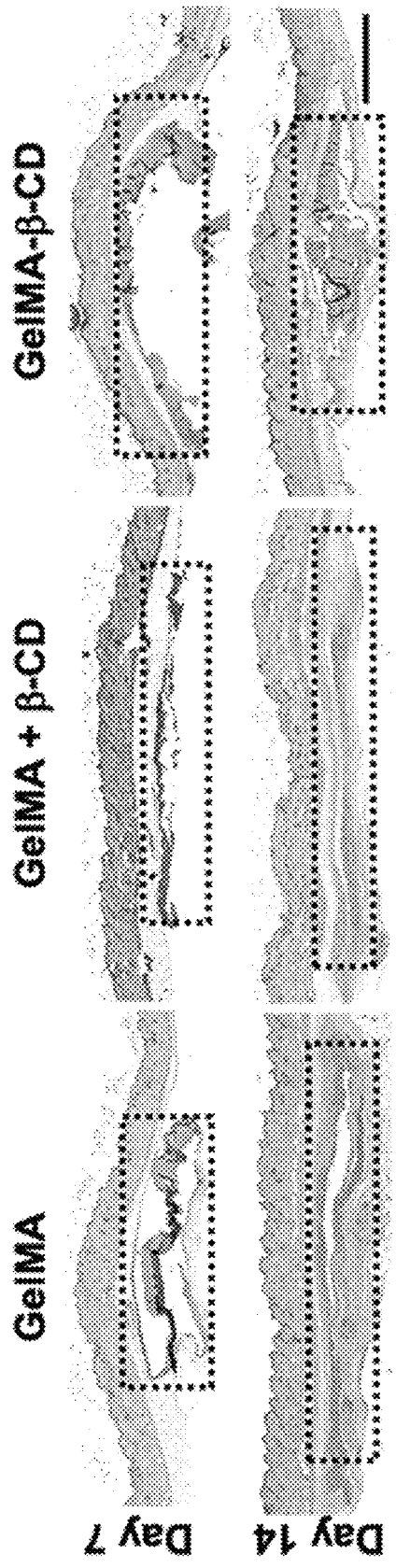
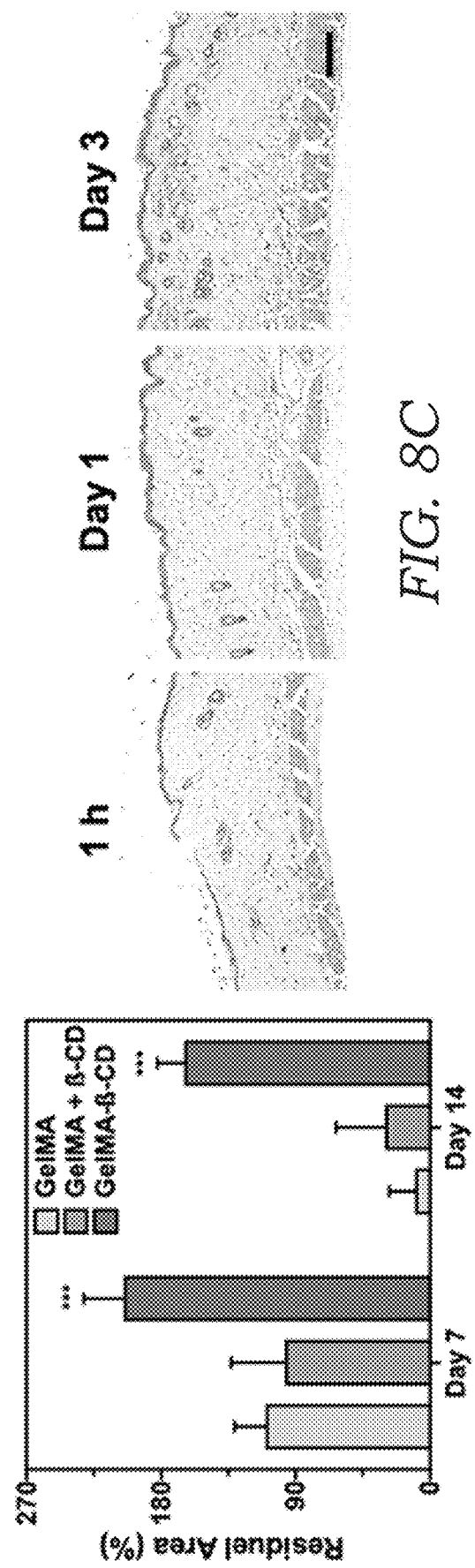
FIG. 8A
FIG. 8B
FIG. 8C

GELATIN METHACRYLOYL-BASED MICRONEEDLE PATCHES FOR DELIVERY OF WATER-INSOLUBLE DRUGS

RELATED APPLICATION

This Application is a U.S. National Stage filing under 35 U.S.C. § 371 of International Application No. PCT/US2021/023753, filed on Mar. 23, 2021, which claims priority to U.S. Provisional Patent Application No. 62/994,740 filed on Mar. 25, 2020, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Numbers EB024403, GM126831, awarded by the National Institutes of Health. The government has certain rights in the invention.

TECHNICAL FIELD

The technical field generally relates to biocompatible microneedles. More particularly, the technical field relates to a patch that incorporates gelatin methacryloyl-based microneedles for the delivery of water-insoluble drugs to tissue.

BACKGROUND

Transdermal drug delivery offers advantages over non-parenteral routes such as bypassing first-pass metabolism and facile administration. Mammalian skin, however, functions as a protective layer to the external environment and a fundamental barrier for transdermal delivery. Various strategies have been developed to overcome this barrier physically including ultrasound, iontophoresis, electroporation, and transdermal microneedle (MN) array patches. Among those, MN arrays have been widely studied in clinical trials because of their capability of penetrating the stratum corneum that greatly enhances systemic drug delivery with minimal pain and improved patient compliance. These properties enable MN arrays to be used for various biomedical applications and precision medicine tools, including insulin delivery, immunotherapy, cancer vaccine, sampling, and contraceptive delivery.

Natural hydrogel-MNs, such as those derived from alginate, cellulose, gelatin, and hyaluronic acid, have drawn extensive attention because of their biocompatibility and innate biodegradability. However, hydrogels are inherently composed of hydrophilic materials that is exclusively compatible with water-soluble molecules such as growth factors, chemokines, or hydrophilic drugs. These gels are not suitable for many drugs as around 90% of FDA approved drugs are lipophilic. Additionally, sustained release of these agents generally requires homogenous distribution of water-insoluble drugs in the matrix, which is challenging to achieve in hydrogel-based materials. Hydrophobic polymers can be implemented for delivery of water-insoluble drugs though these materials generally induce stronger inflammatory responses. Because of clear clinical need, development of biocompatible and biodegradable hydrogel-MN arrays that could directly function as a versatile platform for water-insoluble drug delivery is desired.

SUMMARY

GelMA is derived from the natural polymer gelatin with crosslinkable methacrylate group. The incorporation of methacrylate groups in gelatin endows GelMA with tunable mechanical and drug release properties through the control of crosslinking degree by ultraviolet or visible light. These properties make GelMA an ideal candidate for MN fabrication as well as various other biomedical applications. To harness the favorable properties of GelMA as MN arrays and extend its applications for water-insoluble drug delivery, GelMA side chains were modified with amphiphilic β-cyclodextrin (β-CD) to endow the resulting peptide-saccharide hybrid material with the capability of loading water-insoluble drugs (FIG. 2A). β-CD is derived from enzymatically degraded products of starch with external hydrophilic surface and stable hydrophobic core. It does not change the overall hydrophilicity of hydrogel matrix while being able to trap small molecules and form inclusion complexes. Curcumin was selected as a model for unstable and water-insoluble drugs to test functionality of newly developed biohybrid materials and potential applications as hydrogel-based MN patch (FIG. 2B). The anti-cancer efficacy of curcumin delivered with MN arrays were examined on melanoma B16F10 cell culture and a 3D melanoma spheroid embedded hydrogel. Finally, in vivo biocompatibility and biodegradability of GelMA-β-CD was characterized for in vivo applications.

In one embodiment, a MN-containing patch includes a biodegradable microneedle array formed using the highly biocompatible material gelatin methacryloyl (GelMA) and β-cyclodextrin (β-CD) conjugates. The GelMA-β-CD conjugate is prepared by conjugating carboxymethyl-β-cyclodextrin (CM-β-CD) onto GelMA (~20% methacrylation) backbone through EDC/NHS coupling. The feed ratio of CM-β-CD:GelMA (mg:mg) can be tuned or adjusted from 2:3 to 6:3 (mg:mg) and resulting degree of β-CD modification ranges from about 5 wt % to about 40 wt %.

As an example, curcumin was used as a water-insoluble and unstable model drug to form inclusion complex of GelMA-β-CD and curcumin. The resulting hybrid material (40 wt %) significantly improves loading capacity of curcumin by ~5 times and the stability of encapsulated water-insoluble drugs can be enhanced. It should be appreciated that other water-insoluble or hydrophobic therapeutic agents may be loaded into the GelMA-β-CD conjugate that forms the MN-containing patch.

In one embodiment, a MN-containing patch is disclosed for the delivery of a water-insoluble therapeutic agent across a biological barrier of living tissue. The patch includes a base or substrate having a plurality of microneedles extending away from the surface of the base, wherein the base or substrate and/or the plurality of microneedles are formed from crosslinked gelatin methacryloyl (GelMA) and β-cyclodextrin (β-CD) conjugate (GelMA-β-CD) and the plurality of microneedles contain one or more water-insoluble therapeutic agents therein. The water-insoluble therapeutic agents may be contained in the microneedles and/or the base or substrate from which the microneedles extend.

In another embodiment, an article of manufacture comprising an array of microneedles extending away from the surface of a base or substrate, wherein the plurality of microneedles are formed from crosslinked gelatin methacryloyl (GelMA) conjugated with β-cyclodextrin (β-CD), wherein the plurality of microneedles contain one or more water-insoluble therapeutic agents therein. The degree of conjugation of β-CD on the GelMA may vary but in embodiments is within the range between about 5 wt % to about 40 wt %.

In another embodiment, the MN-containing patch described herein is used by placing the patch on live skin tissue of mammal such that the plurality of microneedles penetrates the epidermal layer of the skin tissue. Other tissue types may also be treated with the MN-containing patch.

BRIEF DESCRIPTION OF THE DRAWINGS

FIG. 2A: Synthesis route of GelMA-β-CD by conjugating GelMA with CM-β-CD via (I) EDC/NHS coupling. (II) Curcumin was loaded within GelMA-β-CD pre-gel solution to form curcumin inclusion complex. FIG. 2B: Schematic for fabrication of GelMA-β-CD/CUR MNs by (III) centrifugation and UV crosslinking; GelMA-β-CD/CUR MN arrays were tested on 3D B16F10 skin cancer model (IV).

FIGS. 3A-3F illustrate the characterization of β-CD conjugation on GelMA backbone and loading of water insoluble drug curcumin. FIG. 3A: NMR spectra of (a) GelMA-β-CD, (b) CM-β-CD, and (c) GelMA. FIG. 3B: FTIR spectra of (a) GelMA-β-CD, (b) CM-β-CD, and (c) GelMA with dash-line enclosed area corresponding to FIG. 3C: Chemical structures of (b) GelMA and (c) CM-β-CD. FIG. 3D: Graph of modification degrees of CM-β-CD on GelMA-β-CD at different feeding weight ratios of GelMA:CM-β-CD. FIG. 3E: Loading capacity of curcumin in GelMA and GelMA-β-CD. FIG. 3F: Optical image of freeze-dried GelMA/CUR and GelMA-β-CD/CUR. (Scale bar: 1 cm).

FIG. 4A: FTIR spectra (500-4000 cm$^{-1}$) and zoomed-in FTIR spectra (900-1900 cm$^{-1}$) (right). FIG. 4B: DSC thermograms of (a) curcumin, (b) GelMA-β-CD+CUR (c) GelMA-β-CD, (d) GelMA-β-CD/CUR. FIG. 4C: Graph showing aqueous stability of curcumin in DPBS. Curcumin was either in free form or in GelMA-β-CD/CUR.

FIGS. 5A-5H illustrate the characterization of MNs properties fabricated with GelMA-β-CD. FIG. 5A: Schematic of MN arrays fabrication process by (I) centrifugation, (II) UV crosslinking, (III) overnight dry and peeled off from PDMS mold. FIG. 5B: Fluorescence image of curcumin loaded MN arrays. Curcumin displays green fluorescence. (Scale Bar: 200 μm) FIG. 5C: SEM image of MNs. (Scale Bar: 300 μm) FIG. 5D: Representative image of a mouse transcutaneously administered with the MN array patch and the enclosed dash-line circle indicating the treatment area. (Scale Bar: 1 cm) FIG. 5E: H&E-staining image of mouse skin showing the penetration of the MN patch into the mouse skin. (Scale Bar: 200 μm) FIG. 5F: Skin penetration of the MN arrays patch. MN arrays patch was applied on mouse cadaver skin and treated with 0.5% trypan blue. (Scale Bar: 2 mm) FIG. 5G: Mechanical strength test and FIG. 5H: In vitro curcumin release study for MNs-0, MNs-15, and MNs-30. MNs-0 refers to microneedles exposed to crosslinking radiation for zero (0) seconds. MNs-15 refers to microneedles exposed to crosslinking radiation for fifteen (15) seconds. MNs-30 refers to microneedles exposed to crosslinking radiation for thirty (30) seconds.

FIG. 6A-6C illustrates the in vitro anticancer efficacy of MNs on B16F10 cells. FIG. 6A: Timeline and schematic of 2D B16F10 melanoma model study via MN arrays patch. FIG. 6B: CCK-8 assay for quantitatively evaluation of cell viability treated by MNs-0, MNs-15, and MNs-30. FIG. 6C: Live/Dead assay for 2D B16F10 cells treated with MNs-0, MNs-15, and MNs-30; control was with no treatment (Scale bar: 100 μm).

FIG. 7A: Design of curcumin delivery study on 3D skin cancer model. FIG. 7B: Optical image of B16F10 spheroid embedded hydrogel (Scale bar: 5 mm). FIG. 7C: 3D reconstructed image of B16F10 spheroid via confocal microscopy (Scale bar: 100 μm). FIG. 7D: 3D reconstructed image of GelMA-β-CD/CUR MNs via confocal microscopy (Scale bar: 600 μm). FIG. 7E: Fluorescent image of MN arrays applied on the spheroid embedded hydrogel (Scale bar: 200 μm). FIG. 7F: Live/Dead screening for viability of spheroid for (a) control, (b) GelMA-β-CD/CUR non-transdermal patch, and (c) GelMA-β-CD/CUR MN arrays (Scale bar: 100 μm).

FIGS. 8A-8E illustrate in vivo biocompatibility and biodegradability of GelMA-β-CD MN arrays. FIG. 8A: H&E staining of materials (GelMA, GelMA+β-CD, and GelMA-β-CD displayed within enclosed region) associated skin tissues at Day 7 and Day 14 of post-implantation (Scale bar: 1 mm). FIG. 8B: Plots showing quantification of residual materials within skin tissues at Day 7 and Day 14 of post-implantation (n=5). FIG. 8C: In vivo biocompatibility evaluation of GelMA-β-CD MN arrays with H&E staining at 1 h, Day 1, and Day 3 post-administration of MN arrays. FIG. 8D: H&E staining of GelMA-β-CD implanted skin showing negligible inflammatory cells at Day 7 and Day 14 of post-implantation (Scale bar: 50 μm). FIG. 8E: Immunohistological staining of immune cells in the tissue. The mice were subcutaneously implanted GelMA-β-CD MN arrays showing no significant local lymphocyte infiltration (CD3) and macrophages (CD68) presence at Day 7 and Day 14 of post-implantation (Scale bar: 50 μm).

DETAILED DESCRIPTION OF ILLUSTRATED EMBODIMENTS

Figure 1A:
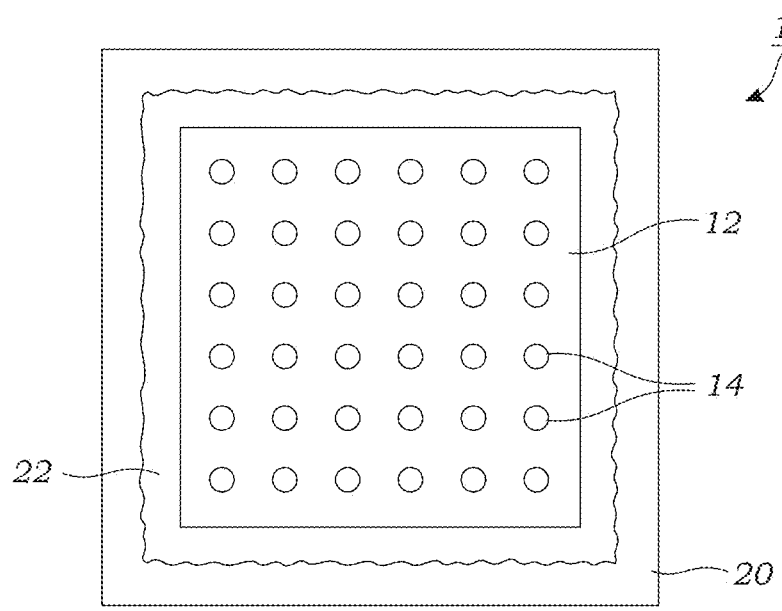
FIG. 1A illustrates a plan view of a patch for transdermal water-insoluble therapeutic agent delivery according to one embodiment. The patch includes a base or substrate and a plurality of microneedles that extend from a surface thereof.

FIG. 1A illustrates plan view of a patch 10 for transdermal therapeutic agent delivery according to one embodiment. The patch 10 includes a base or substrate 12 that includes a plurality of microneedles 14 that extend or project from the substrate 12. The patch 10 is preferably partly or entirely biodegradable. The term biodegradable in the context of a biodegradable patch 10 refers to the base or substrate 12 and/or the microneedles 14 being formed from a material that is biodegradable. Other components such as the backing material 20 discussed below may not be biodegradable yet the patch 10 may still be referred to as being "biodegradable." The plurality of microneedles 14 generally extend or project in a perpendicular direction from a surface of the base or substrate 12. The plurality of microneedles 14 may be arranged in a regular repeating array as illustrated in FIG. 1A or, alternatively, they may be arranged in a random pattern. In one embodiment, the plurality of microneedles 14 that are formed on the base or substrate 12 may have substantially similar shapes and sizes. However, in other embodiments, the plurality of microneedles 14 may have different shapes and/or sizes. For example, the perimeter region of the array or field of microneedles 14 that extend from the base or substrate 12 may be longer or have different shapes than those in the central region of the patch 10 to better secure the patch 10 to site of application.

Figure 1B:
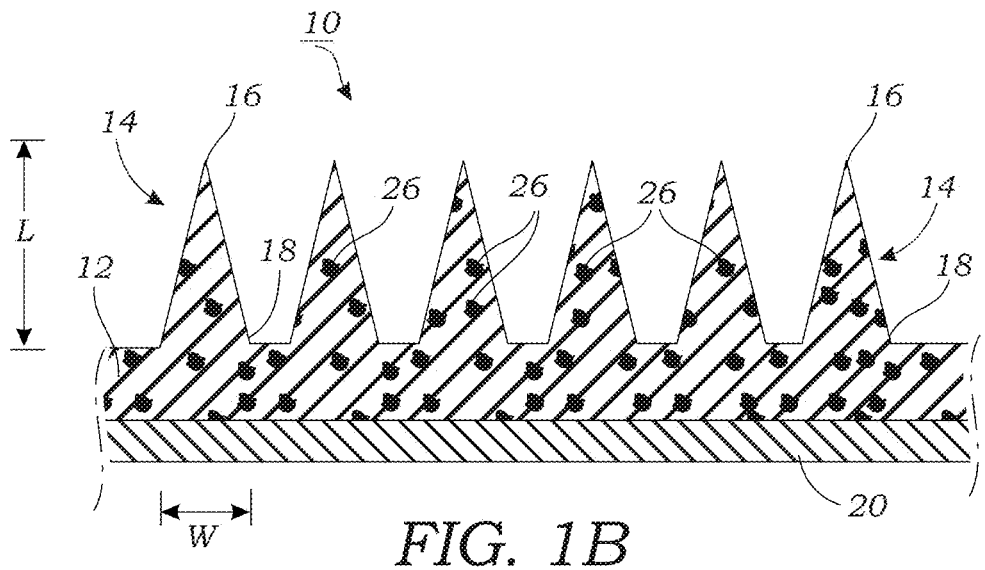
FIG. 1B illustrates a cross-sectional view of a patch illustrating the base or substrate and the plurality of microneedles that extend from a surface thereof. A water-insoluble therapeutic material is illustrated being disposed within the microneedles and the base or substrate.
Figure 1C:
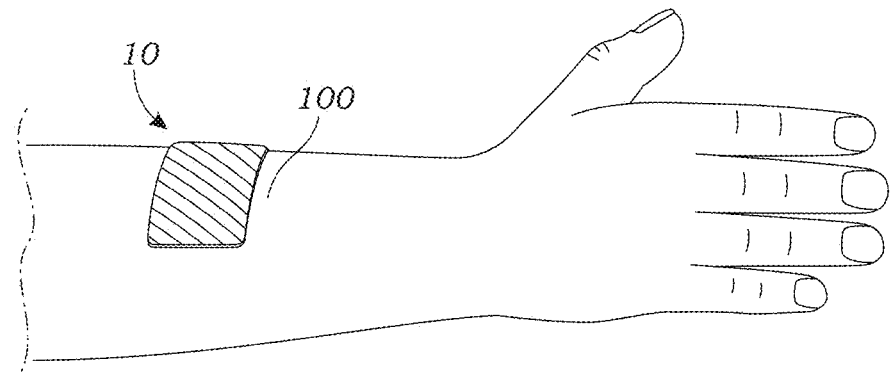
FIG. 1C illustrates a patch for water-insoluble transdermal therapeutic agent delivery being applied to skin tissue of a mammal (e.g., human).

In one particular embodiment, the microneedles 14, as their name implies, have a needle-like shape. For example, the microneedles 14 may include a sharpened tip 16 (seen in FIG. 1B) that aid in penetrating the epidermal layer of the skin tissue 100 (seen in FIG. 1C). The patch 10, however, may also be used with other types of tissue 100. That is so say the patch 10 may be applied to any organ tissue. In one particular application, the patch 10 is applied to external skin tissue 100. The length (L) of the microneedles 14 may vary although typically the microneedles 14 extend less than about 1.5 mm from the base or substrate 12 (FIG. 1B). A typical length of the microneedles 14 is around 300-700 µm, although the dimensions may extend outside this range (e.g., around 10 µm to around 1,500 µm). The base 18 of the microneedle 14 is wider than the tip 16. Typically, the base 18 of the microneedle 14 may have a diameter or width (W) that is less than about 500 µm (e.g., 300 µm base and a height of around 700 µm) (FIG. 1B). The particular dimensions and shape(s) of the microneedles 14 are controlled by the particular construction of the mold M (FIG. 2B) that is used to form the patch 10, which is described more in detail below.

Still referring to FIGS. 1A and 1B, the base or substrate 12 which holds the microneedles 14 may be optionally bonded or otherwise adhered to a backing material 20 (e.g., through the use of an adhesive, chemical linking, or the like) in some embodiments. The backing material 20 may be made from a woven fabric, a plastic material such as polyvinylchloride, polyethylene, or polyurethane, or latex. The backing material 20 may be flexible so that the patch 10, when applied, can conformally cover the tissue 100 (seen in FIG. 1C). Optionally, the backing material 20 may include an adhesive material 22 that covers all or a portion of the tissue-facing surface of the backing material 20. For example, adhesive may be formed on the backing material 20 around the periphery of the base or substrate 12 or the backing material 20 so that the base or substrate 12 may be secured in place to the surface of the tissue 100. The adhesive material 22 aids in securing the patch 10 to the tissue 100. The adhesive material 22 may include resins (e.g., vinyl resins), acrylates such as methacrylates epoxy diacrylates.

The base or substrate 12 and the microneedles 14 may be relatively rigid in the dry state. Because of this, in one alternative embodiment, multiple sub-patches may be integrated into the backing material 20 to make the final patch 10. This may be useful for large coverage areas or curved surfaces that may pose a risk of breakage to the base or substrate 12. The various sub-patches, while generally rigid, are still able to conform to the surface of the tissue 100 (e.g., FIG. 1C) due the flexible backing material 20 which enables bending of the overall patch 10. Because individual sub-patches are smaller in size these do not experience significant bending stresses which would otherwise cause a larger, rigid structure to break in response to bending and/or manipulation. Bending or flexing can occur within the backing material 20 between the locations of where the sub-patches are located (e.g., between the rows and columns of sub-patches).

In one embodiment, with reference to FIG. 1B, the base or substrate 12 and the plurality of microneedles 14 are formed from crosslinked gelatin methacryloyl (GelMA) and β-cyclodextrin (β-CD) conjugate (GelMA-β-CD) that contains one or more water-insoluble therapeutic agents 26 therein. There may be a single water-insoluble therapeutic agent 26 or a combination of different water-insoluble therapeutic agents 26 that work in concert together. The water-insoluble therapeutic agents 26 may include any number of drugs, medicaments, compounds, or pharmacological agents. The water-insoluble therapeutic agent 26 may be dispersed throughout the entirety of the patch 10 including the base or substrate 12 and the plurality of microneedles 14 although in other embodiments the water-insoluble therapeutic agents 26 may be located only or primarily in the microneedles 14. The water-insoluble therapeutic agent 26 may be encapsulated within the crosslinked GelMA-β-CD that forms the microneedles 14 and base or substrate 12.

In another embodiment, the microneedles 14 may contain a first water-insoluble therapeutic agent 26 while the base or substrate 12 may contain a second, different water-insoluble therapeutic agent 26. Alternatively, the microneedles 14 and the base or substrate 12 may contain the same water-insoluble therapeutic agent 26 but at different concentrations. Likewise, the base or substrate 12 may be formed with a different release rate than the release rate of the microneedles 14. This may be accomplished by forming the patch 10 using two different crosslinking operations where the microneedles 14 are crosslinked with a certain exposure time while the base or substrate 12 is crosslinked with a different exposure time (and thus degree of crosslinking). Longer exposure time leads to a higher degree of crosslinking. This can provide different release profiles of different or the same therapeutic agent(s) 26.

As explained herein, the base or substrate 12 and the microneedles 14 are preferably made from crosslinked GelMA-β-CD. GelMA is a derivative of gelatin with modified methacrylamide or methacrylate groups. GelMA-β-CD may be crosslinked by ultra-violet (UV) or visible light in the presence of a photoinitiator.

The microneedles 14 may have a number of different shapes and configurations including, for example, a pyramid, cone, cylindrical, tapered tip, canonical, square base, pentagonal-base canonical tip, side-open single lumen, double lumen, and side-open double lumen. The plurality of microneedles 14 swell upon breaching or penetrating the biological barrier and absorbing fluid from the surrounding tissue 100. The microneedles 14 may swell from about 100% to about 300% (wt. basis). The microneedles 14 swell and, in one embodiment, form a flexible hydrogel. The microneedles 14 provide a path for the water-insoluble therapeutic agent(s) 26 to pass through the biological barrier. In some embodiments, the microneedles 14 are also biodegradable and dissolve over time.

EXPERIMENTAL

Results
Characterization of GelMA-β-CD

Gelatin with a low degree of methacrylation was synthesized due to the need for further chemical modification of GelMA. The degree of MA conjugation was verified using 1H NMR by comparing the intensity of the double bond region (5.2 ppm, representative of the degree of methacrylation) with the integrated intensity of the aromatic region (7.2 ppm, representative of gelatin concentration). Synthesized GelMA was found to be approximately 20% methacrylated and was further used for β-CD modification.

To optimize the conjugation of CM-β-CD onto the GelMA backbone, three different feed ratios of CM-β-CD (200, 400, 600 mg) to the GelMA (300 mg) were selected for the reaction (detailed reaction formulation shown in Table 1).

TABLE 1

| Sample name | GelMA/CM-β-CD (mg/mg) | EDC/NHS (mg/mg) |
|---|---|---|
| GelMA-β-CD (L) | 300/200 | 80/120 |
| GelMA-β-CD (M) | 300/400 | 160/240 |
| GelMA-β-CD (H) | 300/600 | 240/360 |

Table 1: Reaction condition for low (L), medium (M), and high (H) GelMA-β-CD preparation.

Figure 9:
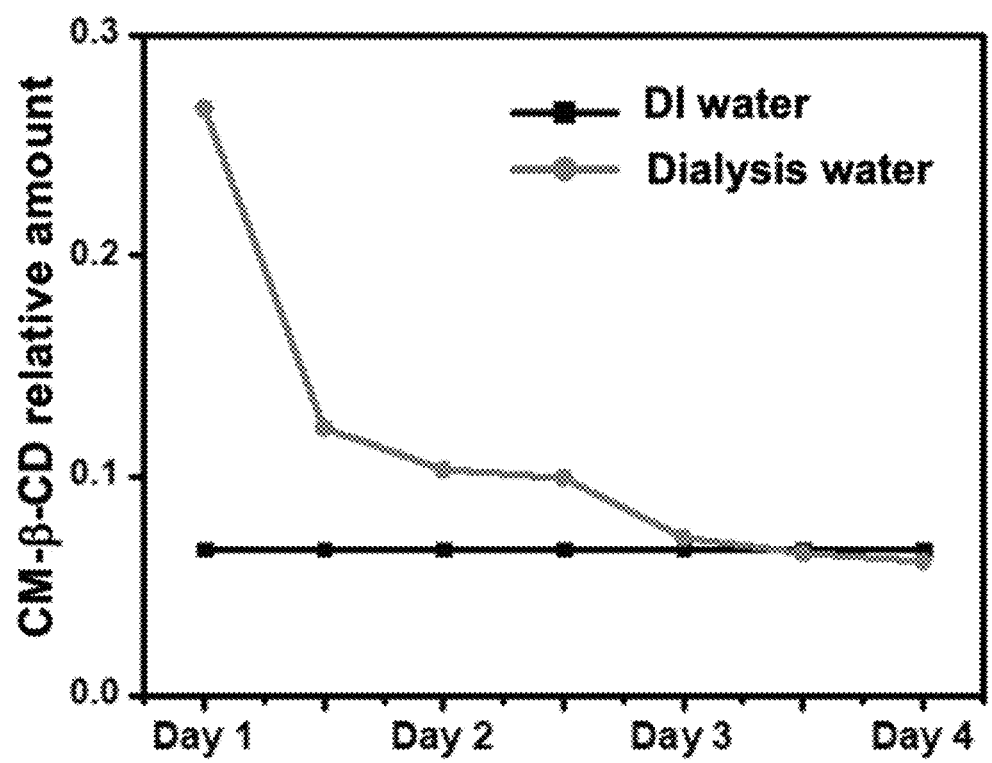
FIG. 9 illustrates a graph showing the confirmation of complete removal of free CM-β-CD within the dialysis water by comparing with the distilled water (DI water) as control. The sulfuric acid-phenol colorimetric assay was performed by measuring the absorbance at 490 nm.
Figure 10A:
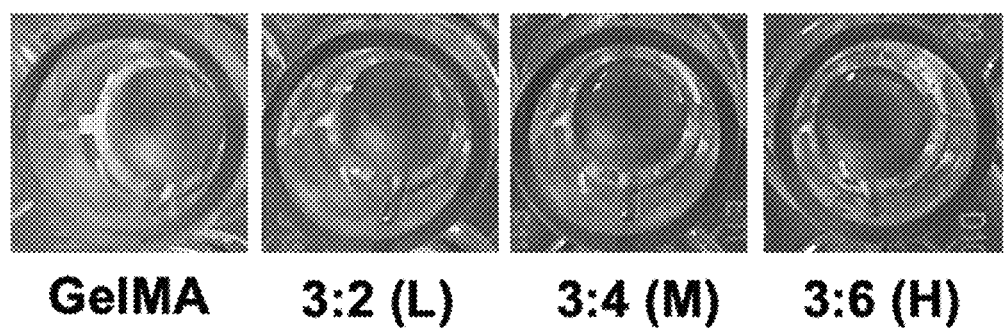
FIG. 10A illustrates a photograph of representative acid-phenol colorimetric assay in 96 well-plate for the modification degree of -CD in gelatin methacryloyl (GelMA), low (L), medium (M), and high (H) GelMA-β-CD.
Figure 10B:
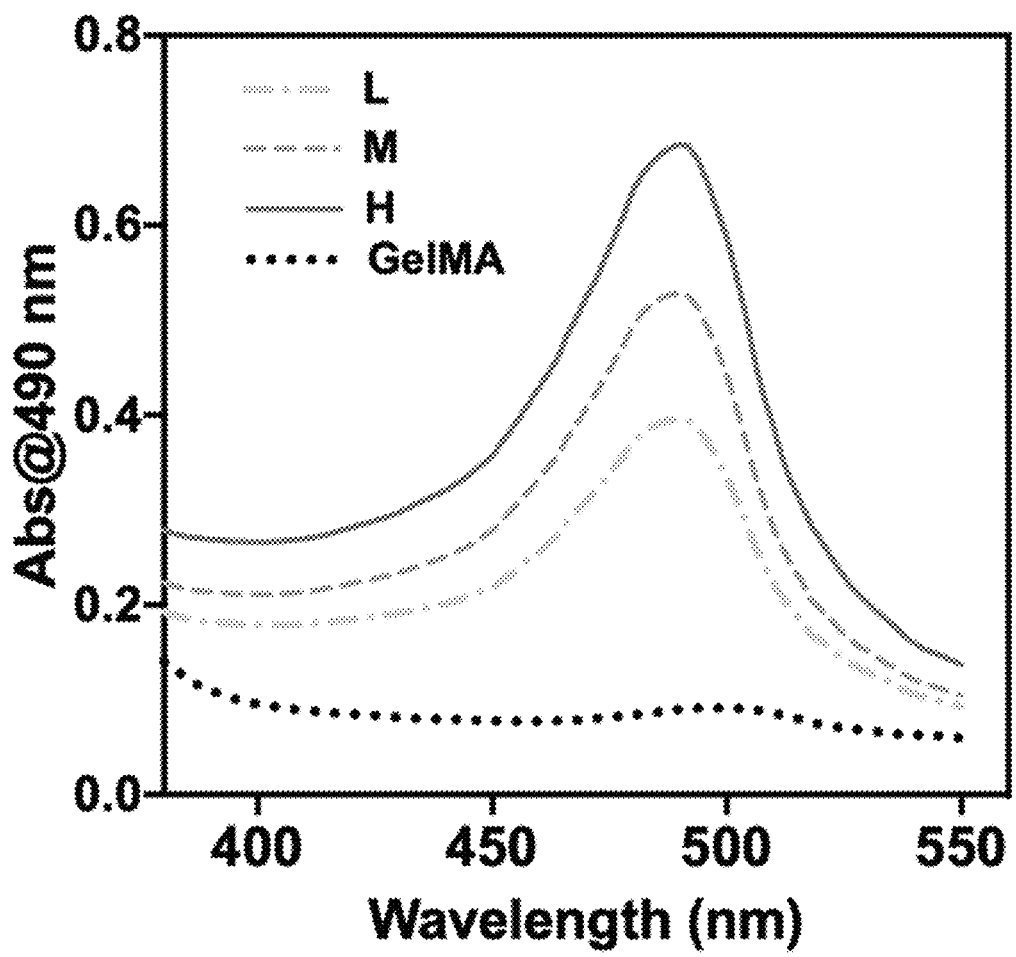
FIG. 10B illustrates the absorbance spectrum of acid-phenol colorimetric assay for low, medium, and high GelMA-β-CD. Peaks at 490 nm were used for estimation of CM-β-CD conjugation.

Because CM-β-CD is the primary factor in establishing drug release activity of the synthesized material, the dialysis process was optimized to ensure unconjugated compound was completely removed from the solution. This process was characterized by the acid-phenol assay shown in FIG. 9 demonstrating that the amount of CM-β-CD in the dialysis water was undetectable relative to DI water after 3 days of dialysis. In addition, both $^1$H NMR and FTIR were used to confirm conjugation by examining the characteristic peaks of GelMA and the polysaccharide ring of CD. FIG. 3A showed the presence of both GelMA and CM-β-CD features in the conjugated polymer GelMA-β-CD. Protons from the double bond of the methacrylate group displayed peaks at 5.3 ppm and 5.7 ppm (region I). The aromatic region from GelMA presented a peak at 7.2 ppm (region II). Characteristic peaks at 4.8 ppm and 5.7 ppm (region IV) were representative of protons in the glucose ring from CM-β-CD. Similarly, in the FTIR spectra (FIG. 3B) the conjugated GelMA-β-CD displayed strong absorption at 1150-1070 cm$^{-1}$ in enclosed region IV corresponding to the ether group of the CM-β-CD. In addition, strong peaks at 1500-1700 cm$^{-1}$ (shown in enclosed region III) came from amide bonds presented in the backbone of the GelMA polymer (FIG. 3C). Both of these confirmed the successful conjugation of CM-β-CD onto the GelMA backbone via EDC/NHS coupling. To quantify the amount of CM-β-CD conjugated, a colorimetric assay was performed where concentrated sulfuric acid and 5% phenol was used to measure the absorbance at 490 nm. The amount of CM-β-CD presented within the GelMA-β-CD was estimated by comparison with a CM-β-CD standard curve. A representative 96 well-plate after conducting the colorimetric assay and measuring the absorbance spectra between 380 nm and 550 nm for low, medium, and high GelMA-β-CD is shown in FIGS. 10A and 10B. As shown in FIG. 3D, the amount of β-CD conjugation was changed from 5 wt % to 40 wt % upon increasing the relative feed ratio. Feed ratios of 3:2, 3:4, and 3:6 altered the weight percentage of conjugated CM-β-CD to 5.4±1.3%, 22.1±0.6%, and 40.4±1.9%, respectively. In further experiments, the formulation yielding the highest degree of CM-β-CD conjugation was used to maximize drug loading capacity. Thus, for applications requiring higher therapeutic agent 26 loading capacity, the amount of β-CD conjugation should be high (e.g., close to about 40 wt %). In one embodiment, the amount of β-CD conjugation is within the range of about 30 to about 40 wt %. In another embodiment, the amount of β-CD conjugation is within the range of about 35 to about 40 wt %.

Figure 11:
FIG. 11 illustrates a photograph of curcumin dissolved in DPBS (2 mg/mL) with most of curcumin settled on the bottom of the container.

Curcumin was selected as a model for water-insoluble drug or therapeutic agent 26 (FIG. 11) to test the loading efficacy of GelMA-β-CD. Aqueous drug suspension was used to compare the loading capacity relative to unmodified GelMA. Curcumin displayed limited solubility in GelMA (84.8±13.5 µg/mL) but GelMA-β-CD had a loading capacity about 5.5 times higher (466.0±31.2 µg/mL) (FIG. 3E). Although the GelMA backbone contains some hydrophobic moieties that could facilitate curcumin loading inside the 3D molecular network, covalently incorporated β-CD significantly increased the solubility of the water insoluble drug 26 through its hydrophobic cavities. The intermolecular interaction between CD and curcumin primarily dictated the desirable properties of water-insoluble drug 26 delivery. This can be seen in FIG. 3F in which the freeze-dried sample of GelMA-β-CD/CUR was observed to be much darker in color than GelMA/CUR, indicating increased curcumin loading.

Characterization of Inclusion Complex

Figure 4A:
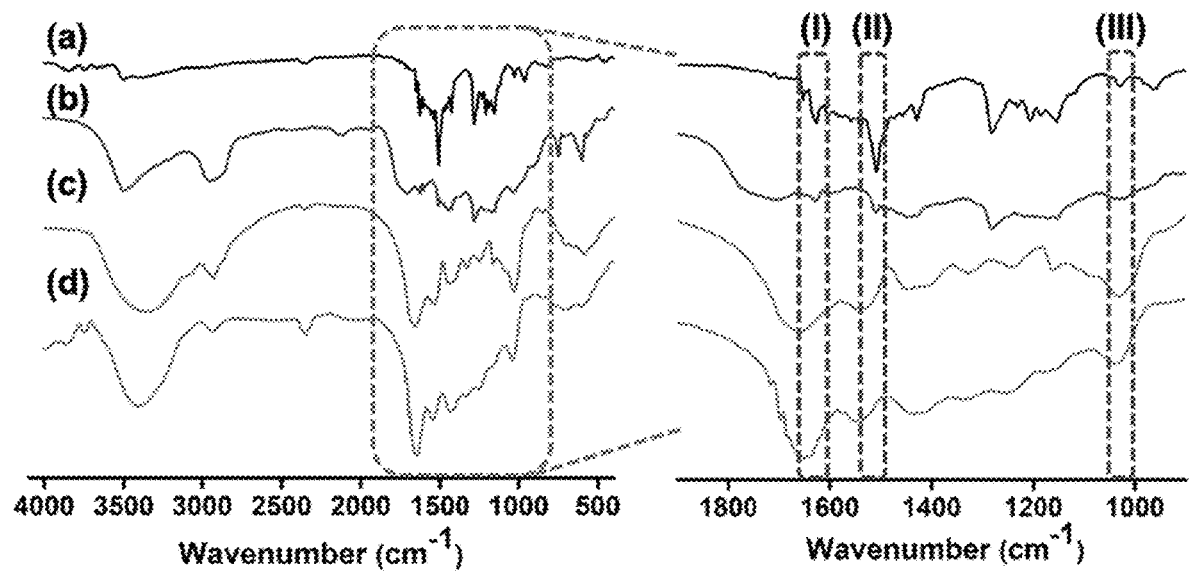
FIGS. 4A-4C illustrate the characterization of GelMA-β-CD/CUR inclusion complex.

Intermolecular hydrophobic interactions between the CD cavities and curcumin enhanced the loading efficiency through the guest-host interactions. The inclusion complexes GelMA-β-CD/CUR were characterized by both FTIR and DSC compared with physical mixture GelMA-β-CD+ CUR. In inclusion complex, curcumin is expected to be inside the cavity of CD while physical mixture should present characteristics of both components since the lack of host-guest interactions. FIG. 4A showed the FTIR spectra of GelMA-β-CD/CUR which closely resembled the spectra of pure GelMA-β-CD except for traces of peaks from curcumin. An expanded view of the same spectra is shown in which free curcumin molecules exhibit peaks at 1602 cm$^{-1}$ and 1627 cm$^{-1}$ (enclosed region (I)), related to the stretching of aromatic ring and C═C, C—O bonds), and a peak at 1509 cm$^{-1}$ (enclosed region (II) representing stretching of C—O bond). The characteristic band appearing at 1033 cm$^{-1}$ was from the vibration of C—O—C of β-CD (shaded area (III)). Strong hydrophobic interactions during the formation of the inclusion complex suppressed few characteristic peaks of curcumin molecules shown in enclosed region (I) and (II) in FIG. 4A. However, in the case of GelMA-β-CD+CUR, the FTIR spectrum contains peaks associated with both components to confirm the lack of host-guest interactions between two components.

Figure 4B:
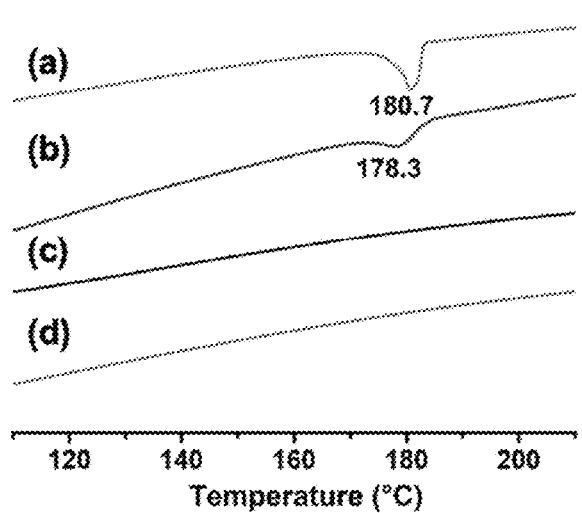

DSC thermograms of curcumin, GelMA-β-CD+CUR, GelMA-β-CD, and GelMA-β-CD/CUR are shown in FIG. 4B. Free curcumin molecules displayed an endothermic peak at ~180.7° C., which corresponded to its melting point. In contrast, GelMA-β-CD did not present a melting endotherm between 100° C. and 220° C. The GelMA-β-CD+CUR yielded the endothermic peak of curcumin, however it was broadened and shifted to 178.3° C. This indicated that, in the physical mixture, free curcumin molecules weakly interacting with the GelMA-β-CD matrix are present. The lower peak position in the thermal profile can be explained by the lower amount of energy needed to break physical interactions between molecules in comparison to the energy required to melt the material. In contrast, the DSC curve of GelMA-β-CD/CUR displayed the features of GelMA-β-CD polymer. The difference between the DSC curves of the physical mixtures and inclusion complex mixtures indicated a strong interaction between curcumin and β-CD and is evidence of the successful inclusion of curcumin molecules inside the cavity of β-CD.

Figure 4C:
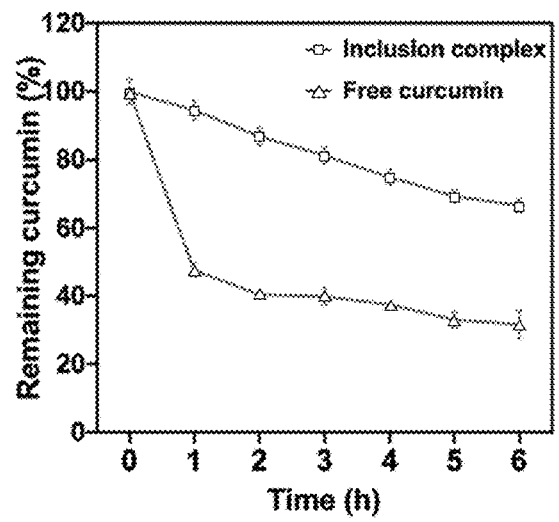

Furthermore, because free curcumin was unstable in aqueous solutions, the presence of the β-CD cavity that formed the inclusion complex not only improved the loading capacity of GelMA-β-CD, but also stabilizes the unstable guest molecules. The stability of curcumin was monitored by measuring absorbance at 430 nm for both the inclusion complex and free curcumin dissolved in DPBS (DPBS diluted with ethanol). The percentage of remaining curcumin was estimated by measuring the absorbance compared to the initial absorbance over a 6 h period. The results (FIG. 4C) demonstrated that only approximately 45% of free curcumin in DPBS remained after 1 h at 37° C. incubation, while the inclusion complex of curcumin maintained 90% of the initial concentration. This result indicates that the formation of an inclusion complex can greatly improve the aqueous stability of curcumin.

MN Arrays Fabrication and Characterization

The GelMA-β-CD/CUR inclusion complex solution was used for the fabrication of biodegradable array of MNs 14 that form a patch 10 (FIG. 5A). Here, GelMA-β-CD/CUR inclusion complex solution was casted into a PDMS mold M for an 11×11 MN array and centrifuged. After crosslinking with UV light and drying overnight, the array of MNs 14 were easily peeled off from the PDMS mold M. Because curcumin fluoresces green, successful loading of curcumin into arrays of MNs 14 was observed with fluorescence microscopy (FIG. 5B). In addition, arrays of MNs 14 were uniformly displayed in the SEM images in FIG. 5C. These images also confirmed that the dimensions of the fabricated arrays of MNs 14 were approximately 600 μm long and 300 μm wide at the base of the MNs 14. In addition, in vivo arrays of MNs 14 penetration (FIG. 5D) was also studied with H&E staining of skins in which the dermal layer was disrupted by the patches 10 containing the array of MNs 14. Tissue sections showed micro-holes from the microneedle tips 16 (FIG. 5E). Fabricated hydrogel-based patches 10 with an array of MNs 14 also demonstrated mechanical strength sufficient to penetrate mouse cadaver skin ex vivo. Trypan blue preferentially stained physically damaged cells showing that successful MN 14 penetration was achieved (FIG. 5F).

In addition, it was demonstrated that by controlling the crosslinking time of the patch 10 with the array of MNs 14 the mechanical and drug release properties can be modulated. The mechanical properties were evaluated by a compression test with a stainless-steel plate. By profiling the applied compressive force and the displacement of the array of MNs 14, it was demonstrated that longer crosslinking times led to higher density of crosslinked networks that required larger force to achieve similar displacement (FIG. 5G). In addition, in vitro curcumin release from the MNs 14 was monitored over a period of 24 h. As shown in FIG. 5H, increased crosslinking time prolonged the drug release time. For MNs-0, 90% of curcumin was released after an 8 h incubation while for MNs-15, only approximately 50% of curcumin was released after a 24 h incubation. Increased crosslinking density led to slower release of curcumin due to the density of the hydrogel network. Interestingly, even in the MNs-0 curcumin was gradually released from the MNs 14, likely due to the physical entrapment of in β-CD. In summary, GelMA-β-CD based MNs 14 were demonstrated to have tunable mechanical properties and drug release profiles by simply adjusting the duration of crosslinking.

In Vitro Anticancer Efficacy of MN Arrays on B16F10 Cells

Figure 12:
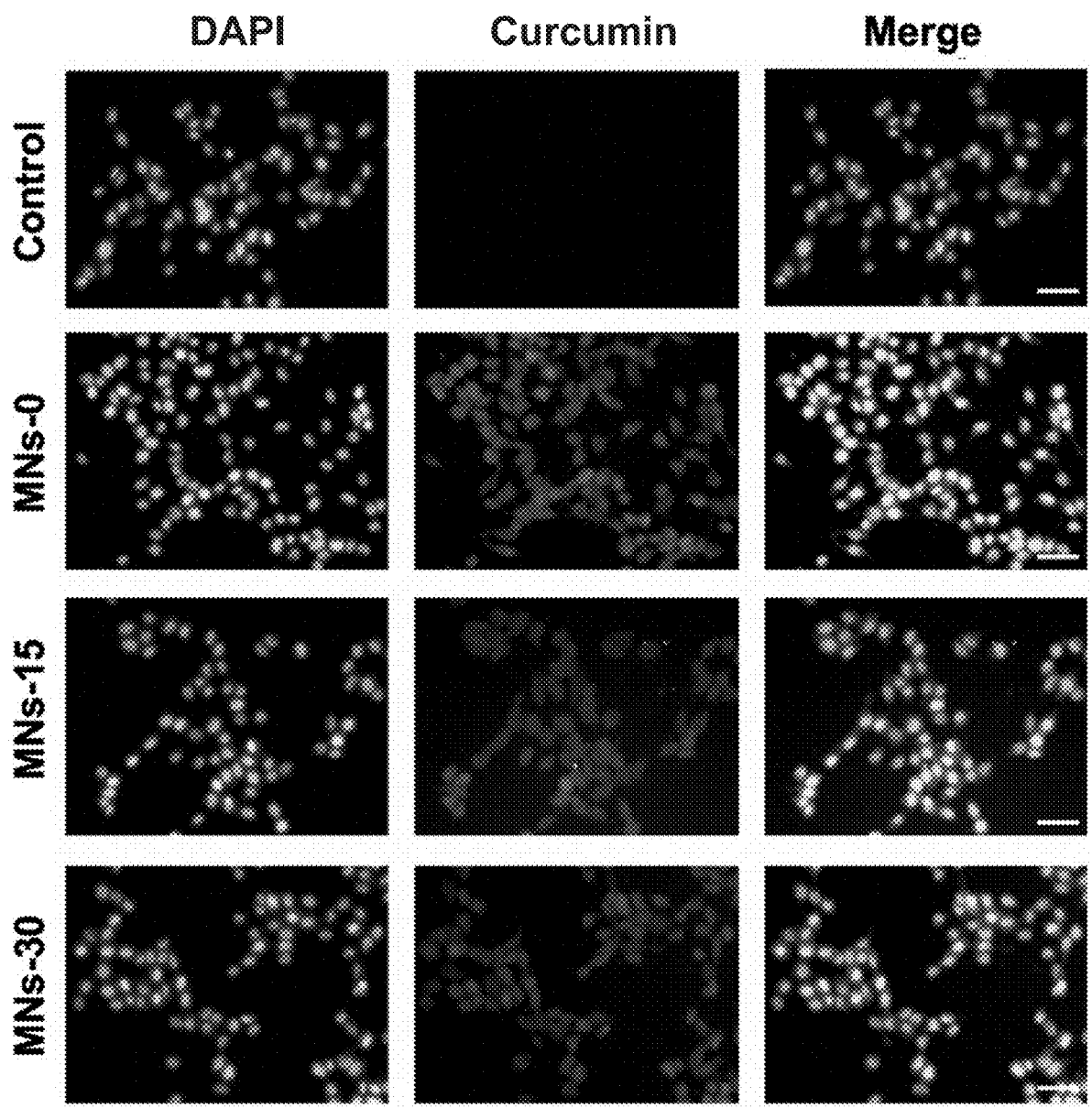
FIG. 12 illustrates curcumin uptake by B16F10 cell after 6-hour incubation with MNs-0, MNs-15, and MNs-30; control group was with no treatment; (Scale bar: 50 µm). DAPI is stained with nuclei of B16F10 cells, curcumin exhibits green fluorescence.

Next, the anticancer efficacy of curcumin released from MNs-0, MNs-15, and MNs-30 was confirmed. The highly invasive mouse melanoma cell line B16F10 was selected as the model cell line. MNs 14 with different crosslinking times were applied to 24 well-plates 24 h after seeding cells, and curcumin uptake was monitored after 6 h of patch 10 application (FIG. 6A). First it was validated that the cells could effectively uptake the released curcumin (FIG. 12). By monitoring the intensity of curcumin green fluorescence, it was observed that slow release of curcumin from MNs-15 and MNs-30 displayed less uptake compared to the non-crosslinked MNs 14 in terms of curcumin fluorescence intensity. Moreover, after 12 h of further incubation with the array of MNs 14, B16F10 cells viability was investigated using the CCK-8 assay. As shown in FIG. 6B, the MNs-30-treated group displayed the highest cell viability while MNs-0 displayed the lowest cell viability. Furthermore, cell death was visualized by a Live/Dead assay in which live cells are stained with green fluorescent calcein and dead cells are stained with red fluorescent EthD-1. As shown in FIG. 6C, cell death occurred in all wells treated with variably crosslinked MN patches 10. However, the degree of cell death was different, showing the same trend as the previous cell viability assay in which the MNs-30-treated group had less cell death compared to the MNs-0 group. This could be due to the faster release of curcumin from the MNs-0 patch yielding a higher local concentration of drug and inducing more cytotoxicity.

In Vitro Anticancer Efficacy of MN Arrays on 3D B16F10 Spheroids

Figure 7A:
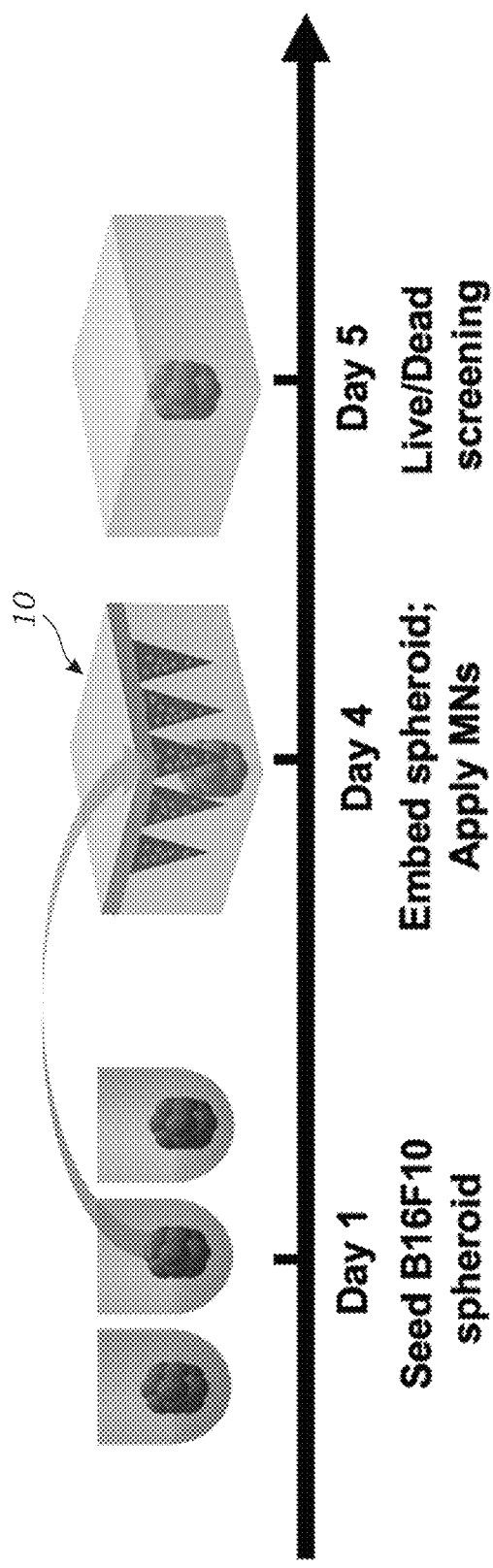
FIGS. 7A-7F illustrate in vitro anticancer efficacy of MNs on 3D B16F10 spheroids.
Figure 7E:
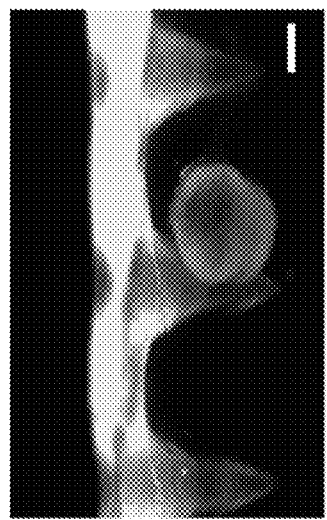
Figure 7D:
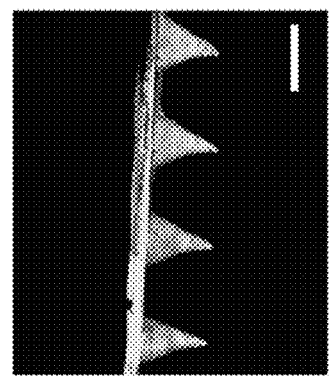
Figure 7C:
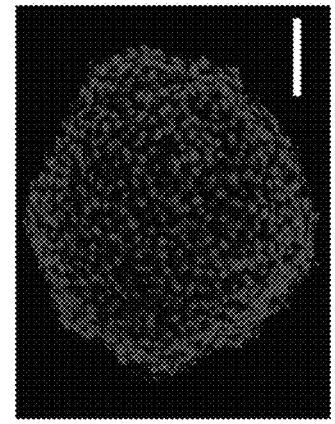
Figure 7B:
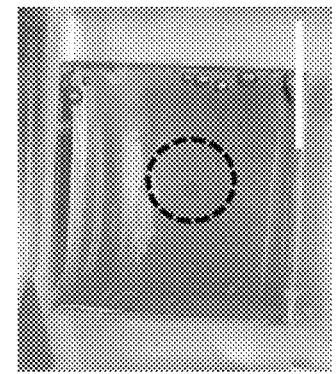
Figure 7F:
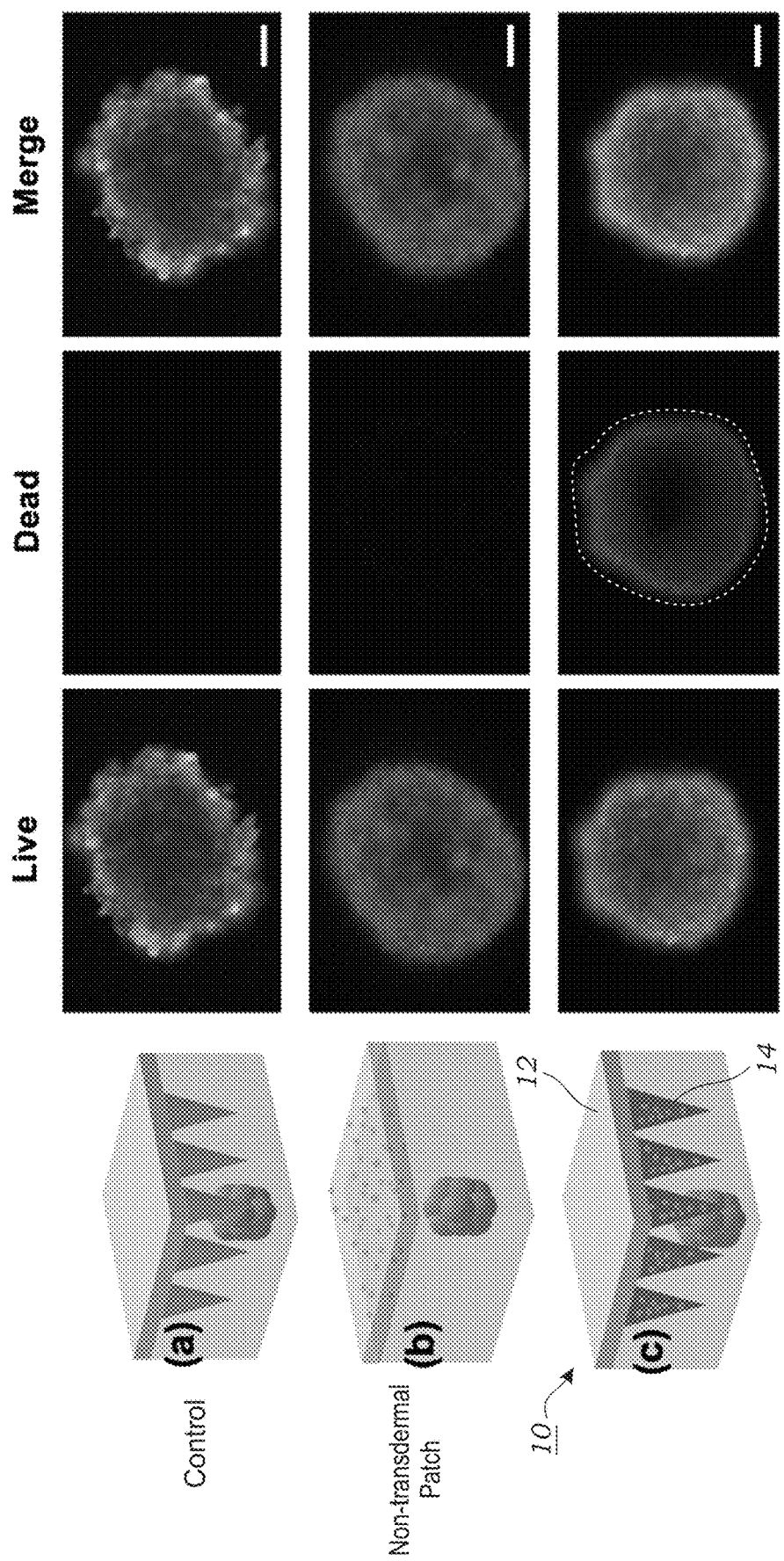
Figure 13:
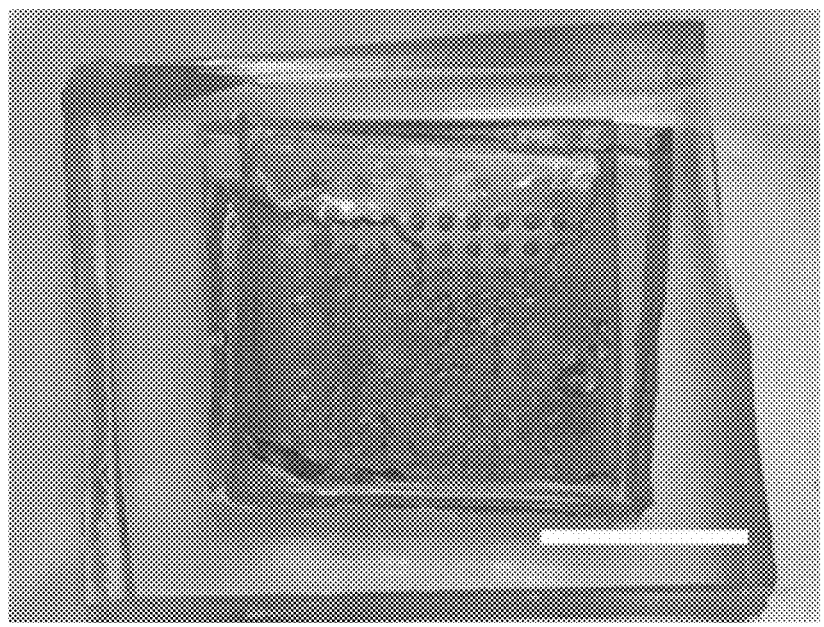
FIG. 13 illustrates a photograph of experimental setup of 3D B16F10 melanoma study with MN arrays applied onto spheroid embedded hydrogel (Scale bar: 5 mm).
Figure 15A:
FIG. 15A illustrates Live/Dead screening for viability of spheroid after the fabrication of 3D skin cancer model (Scale bar: 100 µm).
Figure 15B:
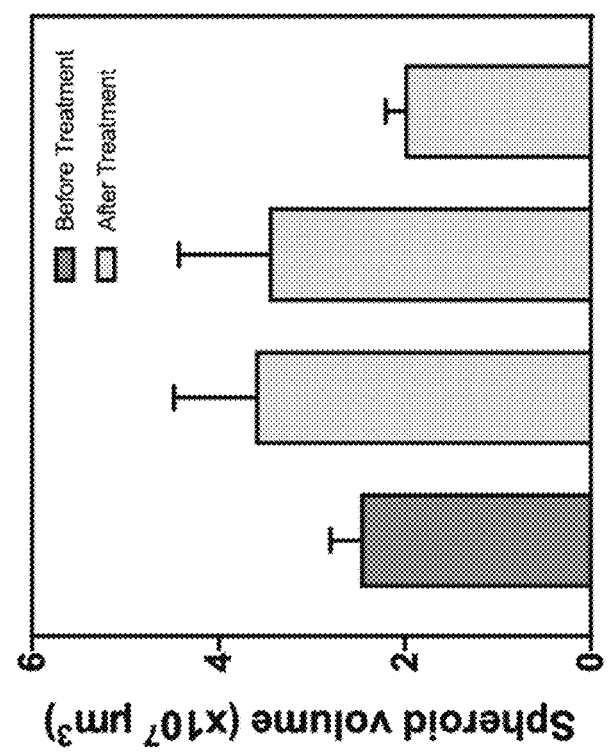
FIG. 15B illustrates spheroid volume change analysis before and after treatment of (a) blank GelMA-β-CD MN arrays, (b) GelMA-β-CD/CUR non-transdermal patch, and (c) GelMA-β-CD/CUR MN arrays (spheroid volume determined by $0.5 \times length \times width^2$).

To prove that the fabricated patches 10 with MNs 14 can be used as an effective tool for transdermal delivery of water-insoluble therapeutic agents 26, a 3D skin cancer model was established by embedding the melanoma spheroids in the GelMA hydrogel, which served as a proxy or model of mammalian tissue 100. Employing a system with 3D tumor spheroids was better than conventional 2D cultures because it provided a more physiologically relevant microenvironment for various anti-cancer drugs 26. Therefore, a 3D skin cancer screening model was designed by embedding B16F10 spheroids into GelMA hydrogel and applied the MNs 14 (FIG. 7A). The GelMA hydrogel functioned as both an extracellular matrix (ECM) for the spheroids as well as a tissue-mimicking substrate on which the patch 10 with MNs 14 can be applied. As shown in FIG. 7B, fabricated spheroids were embedded in a pre-polymer solution held by a PDMS mold M that facilitated later MN 14 application after the solution solidified (FIG. 13). The fabrication process of 3D skin model does not affect cell viability over the study period (FIG. 15A). B16F10 melanoma spheroids were successfully formed after initiation with $8\times10^3$ cells and 3 days of incubation. Spheroids were stained with DAPI and a 3D reconstructed image of the melanoma spheroids was visualized by confocal microscopy shown in FIG. 7C indicating that the diameter of formed spheroids was ~400 μm. The thickness of the spheroid embedded system was ~ 1 mm and the spheroid was located ~ 200 μm below the surface of the hydrogel. Because height of the MNs 14 is ~600 μm, the MNs 14 (FIG. 7D) were long enough to penetrate the model ECM and effectively deliver the therapeutic agent 26 to the target site (FIG. 7E). The efficacy of the array of MNs 14 was evaluated by comparing responses of the spheroid to a GelMA-β-CD/CUR non-transdermal patch, where the base had the same dimension as the backing layer of the microneedle patch 10 but without the MNs 14 (FIG. 7F). After 1-day of application, cell viability was screened by Live/Dead assay. The spheroid volume change analysis after treatment indicated GelMA-β-CD/CUR MN patch treatment can inhibit spheroid growth more effectively compared to non-transdermal patch (FIG. 15B). The arrays with MNs 14 demonstrated improved anticancer efficacy relative to the flat patch due to its deeper penetration into the spheroid model. The dashed region in FIG. 7F for the GelMA-β-CD/CUR MN patch treatment shows increased cell death.

In Vivo Biocompatibility and Biodegradability of GelMA-β-CD MN Arrays

To investigate the biocompatibility and biodegradability of the MN arrays, patches 10 were subcutaneously implanted into C57BL/6J and monitored their degradation in vivo over 14 days. As shown from H&E staining results, all the MN groups tested (GelMA, GelMA mixed with β-CD (GelMA+β-CD), GelMA-β-CD MN) did not cause significant inflammation by day 7. However, it was noted that the patch 10 residual area under the skin were significantly different between groups. The conjugation of β-CD onto the GelMA backbone prolonged the degradation process significantly compared to the GelMA and GelMA+β-CD. At Day 7 and Day 14, GelMA-β-CD was degraded slower than GelMA and GelMA+β-CD displayed in FIGS. 8A and 8B. The prolonged biodegradation could be result of extra crosslinking of the GelMA chains from non-specific EDC/NHS reactions and steric change of the inner gel microstructure due to the presence of β-CD that reduced enzymatic cleavage of the hybrid material.

Figures 8D, 8E:
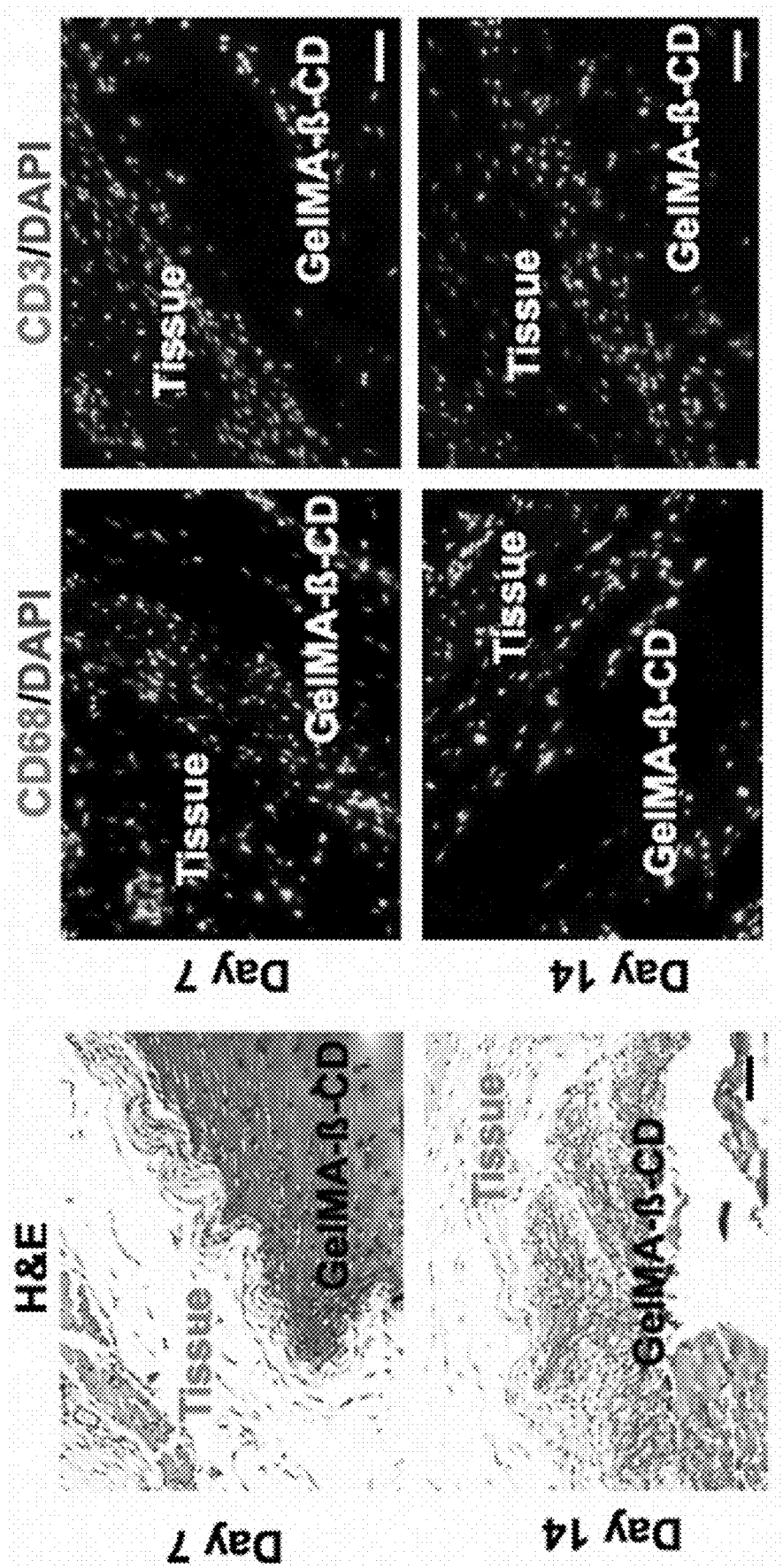
Figure 14:
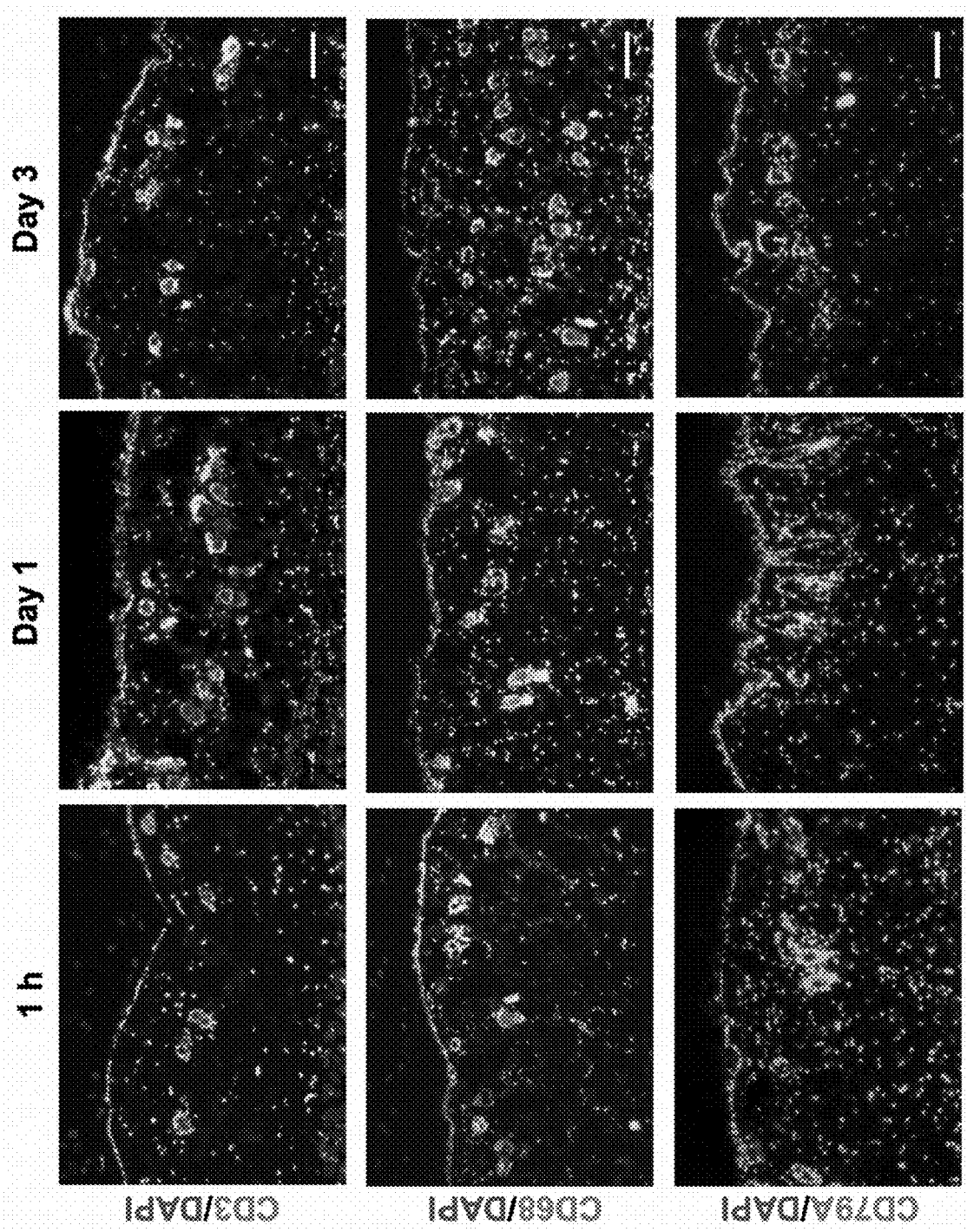
FIG. 14 illustrates in vivo biocompatibility evaluation of GelMA-β-CD MN arrays with immunofluorescence staining of macrophage (CD68), T cell (CD3), and B cell (CD79A) after 1 h, 1-day and 3-day MN arrays administration (scale bar=100 µm).

Biocompatibility was also assessed through topical application of the MN-containing patch 10 to the mouse skin. As shown in FIG. 8C, GelMA-β-CD MNs 14 penetrated the epidermal layer of the skin 100 after 1-hour of topical implantation. No MN arrays-related damage or inflammation was observed up to 3 days. In addition, CD3 (T-cell) and CD68 (macrophage) immunofluorescence staining revealed that there was no significant immune reaction in the MN-applied dermal area (FIG. 14). In addition, CD3 (T-cell), CD68 (macrophage), and CD79A (B cell) immunofluorescence staining revealed that there was no significant immune reaction in the MN-applied dermal area (FIG. 14). Similar to the topical biocompatibility assay, no significant mononuclear cell (CD3+ T-cell or CD68+ macrophage) infiltration was observed around the GelMA-β-CD MN during degradation, as displayed in FIGS. 8D and 8E. Based on these results, the MN-containing patch 10 was biocompatible as gelatin is naturally present within the physiological environment and the conjugation of the additional methacrylate groups and β-cyclodextrin did not induce significant inflammation within the treated area 1 h, 1 day, or 3 days post-administration. The results indicated biosynthetic GelMA-β-CD MN-based patch 10 was biocompatible with the skin 100 and was capable of sustained drug release.

The one or more water-insoluble therapeutic agents 26 are released into the tissue 100 over a period of time. This may be over several hours or several days. In another embodiment, the one or more water-insoluble therapeutic agents 26 are released into the tissue 100 over a period of a week or more. The release profile of the therapeutic agent(s) 26 from the patch 10 may be adjusted or tuned by controlling the degree of crosslinking during patch 10 formation. Longer exposure to light, for example, generally increases the degree of crosslinking and thus slows down the release of therapeutic agent(s) from the microneedles 14. Conversely, release rates may be increased by reducing crosslinking (e.g., reducing the exposure time to light during the crosslinking operation).

DISCUSSION

Hydrogel-based drug delivery systems are particularly attractive and have been applied in multiple pharmaceutical fields for the treatment of cardiovascular diseases, cancer, wounds, and chronic pain. Materials with high water content within hydrophilic networks resemble the structure of native tissue and provide certain level of inherent biocompatibility. Crosslinking within the polymer network can tune the mesh size and porosity to further alter the mechanical and drug release properties of hydrogels. Generally, these advantages can be exploited in hydrogel-based MN arrays. However, these hydrophilic networks are primarily capable of encapsulating water-soluble small molecules or proteins. In terms of lipophilic small molecules, it is challenging to directly load these into hydrogel matrices. Most strategies for transdermal delivery of water-insoluble drugs involve the use of liposomes, dendrimers, or microemulsions in the forms of gel or spray that are directly applied as a topical formulation to the skin. In this case, the stratum corneum presents a major barrier to limit efficient drug penetration. These formulations can also cause skin irritation. Therefore, the localized delivery of water-insoluble drugs with tissue penetrating MNs 14 using a patch 10 is an attractive alternative strategy for transdermal delivery of lipophilic drug.

β-cyclodextrin is an appealing agent in the pharmaceutical field due to its unique amphiphilic structure that facilitates host-guest interactions. The external hydrophilic surface and internal hydrophobic cavity allows it to load water-insoluble molecules and be incorporated into hydrogels without changing the overall hydrophilicity of the network. β-CD has been conjugated with various materials to generate either injectable hydrogels based on dynamic host-guest interactions or formulations for hydrophobic small molecule loading. Two main strategies for creating CD-pendant polymers are: (1) direct polymerization with CD-containing monomers or copolymerization with other monomers; or (2) coupling CD to suitable functional groups on the polymers. In general, the first strategy generates synthetic polymers that are not as biocompatible as natural-derived polymers. The second strategy is mainly used for homopolymers with repeated units, such as dextran, PEG, or chitosan, that allow random functionalization with CD through coupling bonds. Little effort, however, was made to conjugate CD onto gelatin even though gelatin is biocompatible and has uniformly distributed RGD sequences that are essential for cell adhesion and elongation. Previously created CD-pendant gelatin achieved either limited or weak crosslinking because the crosslinking mechanism was strictly dependent on β-CD or physical interactions. In addition, both reactions involve the use of organic solvents that may induce cytotoxicity and not suitable for biomedical applications.

The strategy of further functionalizing GelMA with β-CD in aqueous solvent as described herein maintains the tunable photo-crosslinkable properties of the material while mitigating cytotoxicity related to chemical synthesis. However, this synthesis strategy may also lead to crosslinking between long chains of GelMA or changes in steric hindrance within the hydrogel matrix. These alterations impact the biodegradability of GelMA-β-CD by reducing its degradation rate. Nevertheless, this change in degradation enables sustained release of a therapeutics 26 from a MN 14 depot. Moreover, tunable crosslinking properties using UV light allow further control over the mechanical and drug release properties that dictate transdermal delivery. The incorporation of β-CD improves water-insoluble drug loading, molecular stability, and drug release profile by forming inclusion complexes. Therefore, it is expected that the newly developed hybrid material, GelMA-β-CD and fabricated MN-containing patches 10 can function as a versatile platform for the delivery of water insoluble drugs. Cells suspended within scaffolds may also benefit from hydrophobic small molecule cues to guide differentiation beyond hydrophilic growth factors. As a result, GelMA-β-CD may be a solution that adapts cytocompatible GelMA for this purpose without complicating the system.

The feasibility of modifying GelMA with amphiphilic β-cyclodextrin was demonstrated to effectively load water-insoluble therapeutic agents 26, like curcumin, through the formation of drug-polymer inclusion complex via host-guest interactions. The host-guest system can not only carry water-insoluble drugs in aqueous solutions but also improve the stability of the compounds within the cyclodextrin cavity. Such drug-containing polymer solutions can be further fabricated into MN-containing patches 10. The mechanical strength of the MNs 14 is sufficient for skin tissue 100 penetration, which is a prerequisite of transdermal drug delivery devices. In addition, both mechanical properties and drug release profiles can be adjusted by tuning the degree of crosslinking, making the MN-based patch 10 suitable for various applications. Loaded curcumin maintains its anti-cancer activity in both 2D and 3D in vitro study. In addition, the MN-containing patch 10 demonstrate the ability to locally deliver therapeutics by penetrating the tissue 100. These data suggest that GelMA-β-CD based materials combine unique advantages derived from both GelMA and β-cyclodextrin. This material has great potential to improve the delivery of lipophilic compounds and to develop combination therapies of hydrophilic and hydrophobic drugs that can be used to treat a variety of medical conditions in a minimally invasive way.

Experimental Section

Materials: Gelatin (Type A, 300 bloom from porcine skin), methacrylic anhydride (MA), carboxymethyl-β-cyclodextrin sodium salt (CM-β-CD), N-(3-dimethylaminopropyl)-N'-ethylcarbodiimide hydrochloride (EDC), N-hydroxysuccinimide (NHS), 2-hydroxy-4'-(2-hydroxyethoxy)-2-methylpropiophenone) (UV photoinitiator), curcumin, potassium bromide (KBr) and dimethyl sulfoxide-d6 were purchased from Sigma-Aldrich (Wisconsin, USA). The negative mold of the 11×11 MN (600 μm height and 300 μm base) array in polydimethylsiloxane (PDMS) was purchased from Blueacre Technology (Dundalk, Co Louth, Ireland).

Figure 2A:
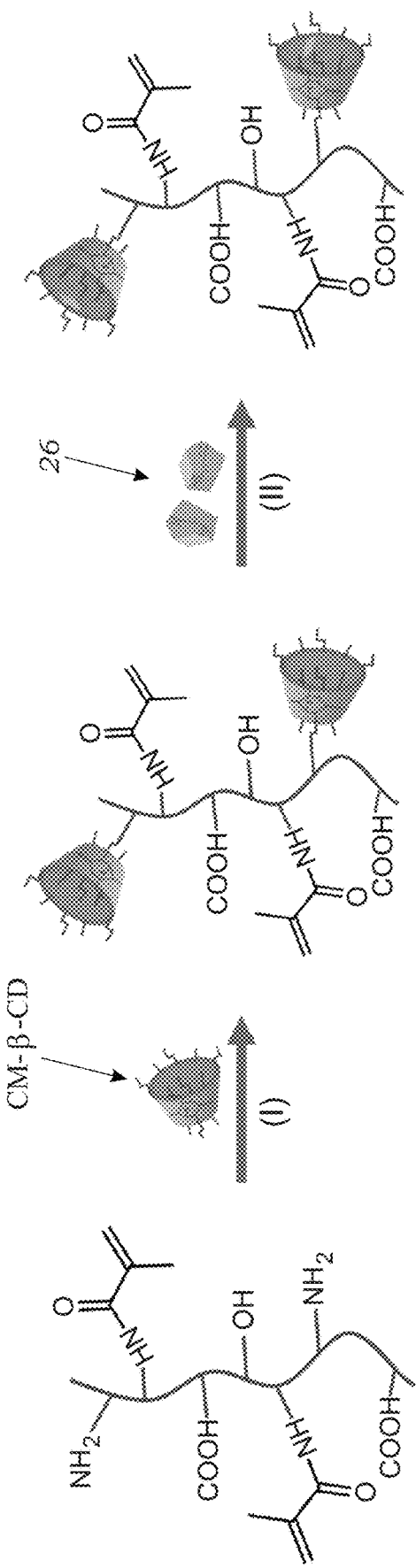
FIGS. 2A-2B illustrate a schematic for GelMA-β-CD synthesis and GelMA-β-CD based microneedle fabrication and application.
Figure 2B:
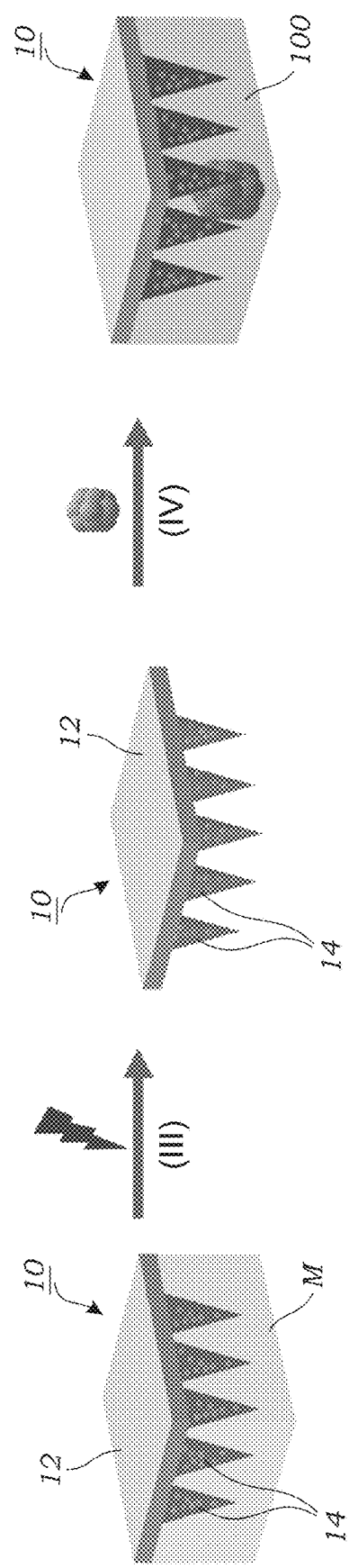

GelMA synthesis: GelMA was synthesized using the established protocol. Briefly, 10 g of type A porcine skin gelatin was slowly added into 100 mL of preheated Dulbecco's phosphate buffered saline (DPBS) at 50° C. and stirred constantly with a magnetic stir bar until fully dissolved. Afterwards, MA (0.25%, v:v) was slowly added to the gelatin solution under vigorous stirring for 3 h at 50° C. Finally, the reaction was stopped by adding warm DPBS (100 mL) to the reaction mixture. Unreacted MA and other species were removed by dialysis in distilled water (40° C.). This was continued for one week in dialysis tubing with a molecular weight cut-off of 12-14 kDa. The dialyzed product was filtered and collected in 50 ml conical tubes for lyophilization. After one-week of lyophilization, a white porous foam of GelMA was obtained and stored at −20° C. until further use.

β-CD conjugated GelMA synthesis: GelMA-β-CD was synthesized based on the previously reported method disclosed in Li et al., β-cyclodextrin-conjugated hyaluronan hydrogel as a potential drug sustained delivery carrier for wound healing, Appl. Polym. Sci., 133, 43072 (2016), incorporated herein by reference, with minor modifications. Briefly, the synthesized GelMA (300 mg) described above was dissolved in 3 mL DPBS (pH=7.4) and kept in an 80° C. oven to fully dissolve. Different amounts of CM-β-CD (200 mg, 400 mg, and 600 mg) were added into 3 mL MES buffer (2-(N-morpholino) ethanesulfonic acid, pH=6) followed by the addition of EDC and NHS to activate the carboxyl group for 30 min (FIG. 2A). After adding 3 mL of the dissolved GelMA solution, the pH of the reaction system was adjusted to 8-9 by adding concentrated NaOH. The reaction was kept with magnetic stirring at 40° C. overnight. Unreacted CM-β-CD and residual salts were removed by dialysis in distilled water for 5 days using dialysis tubing with a molecular weight cut-off of 12-14 kDa. In accordance with the variable amount of CM-β-CD, three types of GelMA-β-CD were obtained and named as low GelMA-β-CD (L), medium GelMA-β-CD (M), and high GelMA-β-CD (H), respectively.

$^1$H NMR: To perform $^1$H NMR analysis, GelMA, CM-β-CD, and GelMA-β-CD were dissolved in dimethyl sulfoxide-d6 respectively at 30 mg/mL concentration. The $^1$H NMR spectra were obtained using a Brucker AV400 broad band FT NMR spectrometer with 256 scans at room temperature for each sample. The time domain data (raw data) was processed in Topspin for peak recognition and integration.

β-CD quantization assay: The amount of conjugated β-CD on the GelMA backbone was determined by a phenol-Sulfuric acid colorimetric assay. Briefly, 20 mg of dried GelMA and GelMA-β-CD (L, M, H) were dissolved in 4 mL of distilled water to prepare stock solutions (5 mg/mL) which were kept in an 80° C. oven until fully dissolved. The stock solutions (5 mg/mL) were further diluted to 0.5 mg/mL for the colorimetric assay. Finally, 30 µL of the diluted solutions from four (4) samples were added into a 96-well plate in triplicate, followed by pipetting 150 µL of concentrated sulfuric acid and 30 µL of 5% phenol solution into each microwell sequentially. The loaded 96-well plate was put in an 80° C. oven for 15 min to ensure complete reaction. Samples were cooled to room temperature prior to absorbance measurement. The absorbance at 490 nm was measured using a plate reader (BioTek, Winooski, VT).

GelMA-β-(D) and curcumin inclusion complex preparation: To prepare the inclusion complex, excess amount of curcumin (5 mg) was added to pre-dissolved GelMA-β-CD solution in 1 mL DPBS (20%, g/mL) and stirred at 37° C. for 30 min to form the inclusion complex solution where curcumin could be encapsulated within the cavity of CD and the resulting solution was named as GelMA-β-CD/CUR. For comparison of curcumin solubility, GelMA was used as a control and the resulting solution was named as GelMA/CUR. After the equilibrium was reached, the suspension was centrifuged at 12,000 rpm for 10 min; supernatants were withdrawn and further filtered through a 0.22 µm film. The inclusion complex solutions were measured for absorbance at 430 nm to assess solubility. The prepared GelMA-β-CD/CUR solution was also used for aqueous stability study compared to free curcumin dissolved in DPBS (DPBS: ethanol as 4:1). The GelMA-β-CD/CUR solutions were freeze-dried for additional FTIR and DSC analysis.

Fourier transform infrared (FTIR) spectroscopy: To confirm the conjugation of β-CD to GelMA, the FTIR spectra of GelMA, CM-β-CD, and GelMA-β-CD were obtained using a Jasco 420 FTIR spectrophotometer recording over the range of 400-4000 $cm^{-1}$. To characterize the inclusion complex GelMA-β-CD/CUR, physical mixtures of GelMA-β-CD and curcumin (named as GelMA-β-CD+CUR) were prepared by pulverizing freeze-dried GelMA-β-CD in mortars and mixing with curcumin powder at weight ratio 20:1 by spatula until the homogeneous mixtures were obtained. The FTIR spectra of curcumin, GelMA-β-CD, GelMA-β-CD+CUR, and GelMA-β-CD/CUR were recorded over a range of 400-4000 $cm^{-1}$ with 128 scans and 1 $cm^{-1}$ resolution. The samples were prepared by mixing each sample with KBr at 1:100 weight ratio and ground into fine powder for pellet preparation.

Differential scanning calorimetry (DSC): DSC curves of curcumin, GelMA-β-CD, GelMA-β-CD+CUR, and GelMA-β-CD/CUR were obtained using a PerkinElmer differential scanning calorimeter. Each sample (3-5 mg) was sealed within an aluminum pan and heated from 80 to 250° C. at a rate of 5° C./min under nitrogen flow of 30 mL/min. An empty sealed aluminum pan was used as a reference.

Microneedle fabrication: GelMA-β-CD/CUR MNs 14 were prepared using a centrifugation method. Briefly, GelMA-β-CD/CUR inclusion complex solution was prepared as above and 5 mg of UV photoinitiator was added into 1 mL GelMA-β-CD/CUR solution (0.5%, g/mL) for MN fabrication. Negative PDMS MN array molds M (FIGS. 2B and 5A) were put inside a 6 well plate and 100 µL of GelMA-β-CD/CUR solution was added on the top of the MN array mold M. The well plate was centrifuged at 3500 rpm for 15 min at 37° C. in order to completely fill the mold M and remove bubbles. The resulting MNs 14 were exposed to 350 $mW/cm^2$ UV light (360-480 nm) for predetermined durations: 0, 15, and 30 s (named as MNs-0, MNs-15, MNs-30). The array of MNs 14 were detached from the PDMS mold M manually after overnight drying shielded from light at room temperature. The GelMA-β-CD/CUR non-transdermal patch 10 was fabricated by pipetting 80 µL GelMA-β-CD/CUR inclusion complex solution into a 1 cm×1 cm PDMS mold M followed by the same procedure used for the MNs 14 described above.

Mechanical strength test: Mechanical testing of the MNs 14 was performed using a 5943 Microtester Instron with a stress-strain gauge. The relationship between the applied force and deformation of the MN tips 16 was recorded and profiled for MNs-5, MNs-15, and MNs-30. First, the MNs 14 were placed on a glass slide with the tips pointing upward, facing the stainless-steel plate 1.5 mm above. The maximum loading force was set to 45.0 N and the stainless-steel plate was moved downward at a constant speed of 0.5 mm/min. The mechanical properties of MNs-5, MNs-15, and MNs-30 were profiled and analyzed.

Ex vivo Skin penetration: Cadaver skin tissue 100 from a mouse was used to perform skin penetration test. The MNs 14 were pushed into the skin 100 with 20 N of force for 30 seconds. Trypan blue (0.5%) was used to stain the penetrated skin 100 for 10 min at room temperature. After washing the stained skin 100 with DPBS three times, the trypan blue-stained MNs-treated skin 100 sample was imaged.

Release of curcumin in vitro: The in vitro release of curcumin from the MNs 14 was evaluated by incubating the MNs 14 in 1 mL of release media at 37° C. in Eppendorf tubes. Release media was prepared by mixing DPBS buffer and DMSO at a 4:1 volume ratio in order to facilitate the dissolution of hydrophobic curcumin. At predetermined times, 10 µL of the sample was withdrawn for absorbance measurement and 10 µL of fresh release media was replaced into the Eppendorf tube which was returned to the incubator. The absorbance of samples at each predetermined time point were detected by Nanodrop at 430 nm and the concentration was interpolated from a curcumin standard curve dissolved in the same media.

In vitro anticancer efficacy: The anticancer efficacy of the released curcumin from MNs 14 was evaluated by using the B16F10 melanoma cell line. Briefly, cultured B16F10 cells were seeded in 24-well plates and incubated to suitable cell density. MNs 14 with different crosslinking times were added into each well and the cells were incubated for another 18 h. The viability of B16F10 cells after treatment with MN-based patches 10 was evaluated by using the CCK-8 assay (Thermo Fisher Scientific, MA, USA) according to the manufacturer's protocol. Live/Dead staining (Thermo Fisher Scientific, MA, USA) was utilized to investigate the viability of B16F10 cells following the manufacturer's protocol and was subsequently imaged with a fluorescent microscope (Zeiss, Sweden).

In vitro anticancer efficacy on 3D cancer spheroids: B16F10 tumor spheroids were formed and cultured to be used to test for anticancer efficacy. Briefly, 50 µL of hot 1.5% (g/mL) agarose solution was distributed into a 96 well plate and transferred to a 4° C. fridge to gel prior to cell seeding. Cultured B16F10 cells were suspended and diluted to a density of 8×10+ cells $mL^{-1}$. 100 µL of the cell suspension was then added to the agarose pre-coated 96 well plate. The cell seeded 96 well plate was centrifuged at 600×g for 10 min to initiate the formation of the B16F10 spheroids. After allowing 3 days for spheroid formation, the spheroids were embedded in GelMA by transferring spheroids into 10% (g/mL) GelMA prepolymer solution followed by 15 s of crosslinking under UV light. The previously fabricated MNs-15 and GelMA-β-CD/CUR non-transdermal patch 10 were applied to the surface of the spheroid-laden hydrogels. Live/dead staining (following the manufacture's protocol) was used to quantify the viability of the spheroids by imaging using a fluorescent microscope (Zeiss, Sweden).

In vivo biodegradation and biocompatibility: All animal experiments were approved by the UCLA Animal Research Committee. The animal experiments were conducted in alignment with relevant guidelines. Seven-week-old, C57BL/6J male mice (average weight: 20 g) were purchased from Jackson Laboratory (Sacramento, CA) and housed in an approved animal facility. For the biodegradability test, GelMA, GelMA mixed with CM-β-CD (GelMA+β-CD), GelMA-β-CD MNs 14 were implanted in mice under inhalation anesthesia (1.5% isoflurane in 100% (2). A 1 cm incision was made on the posterior dorsal skin and a 1 cm×1 cm dry patch was subcutaneously implanted for 7 and 14 days. To determine the capability of MNs 14 to penetrate skin 100 and to identify side effects (biocompatibility), GelMA-β-CD based MNs 14 were also topically applied for 1 hour, 1 day, and 3 days.

Histological analysis and immunofluorescent staining: To analyze the response of the host skin tissue to the application of the MNs 14, animals were sacrificed using $CO_2$. Skin tissue 100 subject to MNs 14 treatment was immediately collected and fixed in 10% neutral buffered formalin (Leica Biosystems, IL, USA). Fixed tissues 100 were processed using standard methods and embedded in paraffin. 4 μm skin tissue sections were stained with hematoxylin (Leica Biosystems) and eosin (Sigma) (H&E) staining. Histology images were acquired with a Nikon inverted microscope. Quantitative data such as percentage of residual microneedle area was measured using the AmScope image analysis software (AmScope, Irvine, CA, USA). Additionally, serial formalin-fixed tissue sections were used for immunofluorescence staining. The sections were deparaffinized and underwent heat-induced antigen retrieval according to the protocol. Sections were soaked in antigen retrieval buffer, permeabilized in PBST (PBS+0.3% Triton), and blocked with Goat serum for 30 min. Then, sections were incubated overnight at 4° C. with primary antibodies targeting CD3 (Rat, 1:200; Abcam, Cambridge, UK) and CD68 (Rat, 1:200; Abcam). After incubation, the sections were rinsed with PBST and incubated with 1:1000 diluted Alexa 555-conjugated secondary antibody (Thermo Fisher Scientific, MA, USA) at room temperature for 60 min and counterstained with 4',6-Diamidino-2-Phenylindole, Dihydrochloride (DAPI) (Thermo Fisher Scientific, MA, USA) for 5 min. The fluorescent images were collected using a Nikon Eclipse Ti-S Inverted Phase Contrast Fluorescent Microscope.

Statistical analysis: All data is presented as the mean±standard deviation (SD). Student's t-test were performed for statistical significance. Significance is denoted in the FIGS. as $*p<0.05$, $p<0.01$ and $*p<0.001$.

While embodiments of the present invention have been shown and described, various modifications may be made without departing from the scope of the present invention. The invention, therefore, should not be limited, except to the following claims, and their equivalents.

What is claimed is:

1. A patch for the delivery of a water-insoluble therapeutic agent across a biological barrier of living tissue, the patch comprising a base or substrate having a plurality of microneedles extending away from the surface of the base or substrate, wherein the plurality of microneedles are formed from crosslinked gelatin methacryloyl (GelMA) and b-cyclodextrin (b-CD) conjugate (GelMA-b-CD) and the plurality of microneedles contain one or more water-insoluble therapeutic agents therein.

2. The patch of claim 1, wherein upon application of the patch on the living tissue, the plurality of microneedles become wetted and swell, the plurality of microneedles providing a pathway for the one or more water-insoluble therapeutic agents to pass through the biological barrier and into the tissue.

3. The patch of claim 1, wherein the plurality of microneedles are biodegradable.

4. The patch of claim 1, wherein the degree of conjugation of b-CD on the GelMA is within the range between about 5 wt % to about 40 wt %.

5. The patch of claim 1, wherein the base is formed from crosslinked gelatin methacryloyl (GelMA) and b-cyclodextrin (b-CD) conjugate (GelMA-b-CD).

6. The patch of claim 5, wherein the base further comprises one or more water-insoluble therapeutic agents contained therein.

7. The patch of claim 1, wherein the biological barrier of living tissue comprises skin.

8. The patch of claim 1, wherein the one or more water-insoluble therapeutic agents are released into the tissue over a period of several hours.

9. The patch of claim 1, wherein the one or more water-insoluble therapeutic agents are released into the tissue over a period of several days.

10. The patch of claim 1, wherein the one or more water-insoluble therapeutic agents are released into the tissue over a period of a week or more.

11. The patch of claim 1, wherein the plurality of microneedles have a length of less than about 1.5 mm.

12. The patch of claim 1, wherein the plurality of microneedles have a length within the range of about 10 μm to about 1,500 μm.

13. The patch of claim 1, wherein multiple different water-insoluble therapeutic agents are contained in the plurality of microneedles.

14. The patch of claim 1, wherein the water-insoluble therapeutic agent comprises a chemotherapeutic agent.

15. The patch of claim 1, further comprising a backing material having an adhesive disposed thereon.

16. A method of using the patch of claim 1, comprising placing the patch on live organ tissue of mammal such that the plurality of microneedles penetrates into the tissue.

17. The method of claim 16, wherein the tissue comprises skin tissue and the plurality of microneedles penetrates the epidermal layer of the skin tissue.

18. An article of manufacture comprising an array of microneedles extending away from the surface of a base or substrate, wherein the plurality of microneedles are formed from crosslinked gelatin methacryloyl (GelMA) conjugated with b-cyclodextrin (b-CD), wherein the plurality of microneedles contain one or more water-insoluble therapeutic agents therein.

19. The article of manufacture of claim 18, wherein the one or more water-insoluble therapeutic agents comprise a chemotherapeutic agent.

20. The article of manufacture of claim 18, wherein the degree of conjugation of b-CD on the GelMA is within the range between about 5 wt % to about 40 wt %.

* * * * *